United States Patent
Ueda

(10) Patent No.: US 12,009,914 B2
(45) Date of Patent: Jun. 11, 2024

(54) CONTROL SYSTEM, COMMUNICATION CONTROL METHOD OF CONTROL SYSTEM, AND CONTROL DEVICE

(71) Applicant: OMRON CORPORATION, Kyoto (JP)

(72) Inventor: Takamasa Ueda, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 102 days.

(21) Appl. No.: 17/771,710

(22) PCT Filed: Mar. 3, 2020

(86) PCT No.: PCT/JP2020/008947
§ 371 (c)(1),
(2) Date: Apr. 25, 2022

(87) PCT Pub. No.: WO2021/084771
PCT Pub. Date: May 6, 2021

(65) Prior Publication Data
US 2022/0376806 A1    Nov. 24, 2022

(30) Foreign Application Priority Data
Nov. 1, 2019   (JP) ................ 2019-200175

(51) Int. Cl.
*H04J 3/06*   (2006.01)
(52) U.S. Cl.
CPC ................ *H04J 3/0638* (2013.01)
(58) Field of Classification Search
CPC ................ H04L 5/14; H04J 3/0638
See application file for complete search history.

(56) References Cited

U.S. PATENT DOCUMENTS 8,670,491 B2 *   3/2014   Na .................. H04J 3/0673
                                           375/256
9,154,292 B2 * 10/2015   Mizuguchi ........ H04B 7/18513
(Continued)

FOREIGN PATENT DOCUMENTS

CN   1706144 A    12/2005
CN   201127028 Y  10/2008
(Continued)

OTHER PUBLICATIONS

International Search Report of PCT/JP2020/008947 dated May 26, 2020 [PCT/ISA/210].
(Continued)

*Primary Examiner* — Bailor C Hsu
(74) *Attorney, Agent, or Firm* — Sughrue Mion, PLLC

(57) ABSTRACT

The communication master repeats transmission of first information indicating a counter value of a synchronization counter of the communication master to the one or more communication slaves through a network. Each of the one or more communication slaves updates the counter value of the synchronization counter of each of the one or more communication slaves based on the received first information upon receiving the first information from the communication master. The communication master manages a total number of pieces of the first information transmitted for each of the one or more communication slaves, and estimates synchronization accuracy with respect to the communication master for each communication slave based on a number of transmissions of the first information for each communication slave.

20 Claims, 15 Drawing Sheets

(56) References Cited

U.S. PATENT DOCUMENTS

| | | | |
|---|---|---|---|
| 9,826,538 B2 * | 11/2017 | Kizu | H04B 1/713 |
| 9,923,656 B2 * | 3/2018 | Tenea | H04L 43/50 |
| 11,153,670 B1 * | 10/2021 | Winzer | H04J 3/0667 |
| 2006/0112191 A1 | 5/2006 | Ooi | |
| 2007/0223464 A1 * | 9/2007 | Weir | H04L 65/104 |
| | | | 370/356 |
| 2010/0220748 A1 | 9/2010 | Inomata | |
| 2011/0150005 A1 * | 6/2011 | Chen | H04J 3/0667 |
| | | | 370/503 |
| 2012/0182909 A1 | 7/2012 | Yamamoto | |
| 2013/0272322 A1 | 10/2013 | Sagarwala et al. | |
| 2015/0058432 A1 | 2/2015 | Mizutani | |
| 2016/0266563 A1 | 9/2016 | Mizutani et al. | |
| 2016/0292110 A1 | 10/2016 | Niwa et al. | |
| 2018/0101381 A1 | 4/2018 | Fukuda et al. | |
| 2018/0284710 A1 | 10/2018 | Abe et al. | |
| 2019/0222407 A1 | 7/2019 | Yoshida et al. | |
| 2019/0253497 A1 * | 8/2019 | Yoneda | H04L 67/12 |
| 2020/0137704 A1 * | 4/2020 | Vermani | H04L 5/0035 |
| 2020/0244381 A1 | 7/2020 | Yoneda et al. | |
| 2022/0124656 A1 * | 4/2022 | Venkatesan | H04L 7/0012 |
| 2022/0338143 A1 * | 10/2022 | Fu | H04W 74/0833 |

FOREIGN PATENT DOCUMENTS

| | | |
|---|---|---|
| CN | 104126155 A | 10/2014 |
| CN | 105450384 A | 3/2016 |
| CN | 106020094 A | 10/2016 |
| CN | 108693821 A | 10/2018 |
| CN | 109283864 A | 1/2019 |
| EP | 3758271 A1 | 12/2020 |
| JP | 2009-153311 A | 7/2009 |
| JP | 2012-023654 A | 2/2012 |
| JP | 2014-120884 A | 6/2014 |
| JP | 2016-152488 A | 8/2016 |
| JP | 2018-060482 A | 4/2018 |
| JP | 6523497 B1 | 6/2019 |
| JP | 2019-146060 A | 8/2019 |
| WO | 2011/043341 A1 | 4/2011 |
| WO | 2015/056695 A1 | 4/2015 |

OTHER PUBLICATIONS

Written Opinion of PCT/JP2020/008947 dated May 26, 2020 [PCT/ISA/237].

Communication dated Aug. 8, 2023 issued by the Japanese Patent Office in application No. 2019-200175.

Extended European Search Report dated Nov. 7, 2023 in European Application No. 20880744.6.

Chinese Office Action dated Jan. 6, 2024 in Chinese Application No. 202080074513.0.

* cited by examiner

CONTROL SYSTEM, COMMUNICATION CONTROL METHOD OF CONTROL SYSTEM, AND CONTROL DEVICE

CROSS REFERENCE TO RELATED APPLICATIONS

This application is a National Stage of International Application No. PCT/JP2020/008947 filed Mar. 3, 2020, claiming priority based on Japanese Patent Application No. 2019-200175 filed Nov. 1, 2019, the entire contents of each of which being herein incorporated by reference in their entireties.

TECHNICAL FIELD

The present invention relates to a control system capable of synchronizing a plurality of devices connected to a network, a communication control method of the control system, and a control device configuring the control system.

BACKGROUND ART

A factory automation (FA) technology using a control device such as a programmable logic controller (PLC) is widely used in various production sites. With development of information and communication technology (ICT) in recent years, such a control device in the FA field is increasingly improved in performance and functionality.

One or a plurality of input and output (JO) devices may be network-connected to the control device. A configuration that enables synchronous control between IO devices connected to a network is provided in order to improve control performance.

For example, Japanese Patent Laying-Open No. 2018 060482 (PTL 1) discloses a configuration in which a transmission and reception controller of a communication slave circuit includes a counter synchronized with a transmission and reception controller of a communication master circuit and timing of frame transfer on a local network is managed according to the synchronized counter.

CITATION LIST

Patent Literature

PTL 1: Japanese Patent Laying-Open No. 2018-060482

SUMMARY OF INVENTION

Technical Problem

In the configuration disclosed in Japanese Patent Laying-Open No. 2018 060482 (PTL 1), information (for example, a counter value of a current communication master) about establishment of the synchronization is transmitted from a device functioning as the communication master, and a device functioning as a communication slave appropriately adjusts the counter or the like based on the transmitted information. For this reason, in order to establish the synchronization with predetermined accuracy after connection to the network, a large number of pieces of information are required to be received, and a predetermined time is required.

In a process of establishing the synchronization, the communication master cannot check how much degree of accuracy each communication slave is synchronized. Consequently, the communication master cannot know which timing the communication slave can implement the highly accurate control.

An object of the present invention is to provide a control system and the like that can satisfy the above-described requirements.

Solution to Problem

A control system according to an example of the present invention includes a communication master and one or more communication slaves network-connected to the communication master. Each of the communication master and the one or more communication slaves includes a synchronization counter. The communication master includes means configured to repeat transmission of first information indicating a counter value of the synchronization counter of the communication master to the one or more communication slaves through a network. Each of the one or more communication slaves includes means configured to update the counter value of the synchronization counter of each of the one or more communication slaves based on the received first information upon receiving the first information from the communication master. The communication master includes means configured to manage a total number of pieces of the first information transmitted for each of the one or more communication slaves, and estimate synchronization accuracy with respect to the communication master for each communication slave based on a number of transmissions of the first information for each communication slave.

According to this configuration, the synchronization accuracy with respect to the communication master for each communication slave can be estimated based on the number of transmissions of the first information transmitted from the communication master, so that whether to execute the control processing can be appropriately determined based on the estimated synchronization accuracy.

The communication master may be a control device that executes a user program. The synchronization accuracy estimated for each communication slave may be referred to in the user program. According to this configuration, the synchronization accuracy estimated for each communication slave can be referred to in the user program, so that whether or not the user program can be executed can be appropriately controlled according to the synchronization accuracy.

The synchronization accuracy estimated for each communication slave may be referred to as a structure variable. According to this configuration, the synchronization accuracy of the target communication slave can be easily referred to by designating a member of the structure variable.

In the user program, the synchronization accuracy may be referred to in a plurality of predetermined communication slaves as a whole. According to this configuration, the state of the synchronization accuracy of the plurality of communication slaves as a whole to be subjected to the synchronization control can be easily obtained.

The synchronization accuracy in the plurality of predetermined communication slaves as a whole may be output from a function block command. According to this configuration, the synchronization accuracy of the plurality of target communication slaves can be easily acquired in association with the function block command that collectively controls the plurality of predetermined communication slaves.

The communication master may determine the synchronization accuracy of one of the communication slaves based on the number of transmissions of the first information to the one of the communication slaves with respect to the predetermined number of transmissions. According to this configuration, the synchronization accuracy can be numerically evaluated based on the number of transmissions serving as a predetermined evaluation criterion.

When an additional communication slave is newly connected to the network, the communication master may reset the number of transmissions of the first information for the communication slave. According to this configuration, the synchronization accuracy can be determined by reflecting processing of updating the synchronization counter each time the communication slave is connected to the network.

Each of the one or more communication slaves may update the counter value of the synchronization counter based on the first information received from the communication master and a propagation delay time acquired in advance. According to this configuration, the counter value of the synchronization counter in each communication slave can be updated in consideration of the propagation delay time generated in the network.

According to another example of the present invention, there is provided a communication control method of a control system including a communication master and one or more communication slaves connected to a network. Each of the communication master and the one or more communication slaves includes a synchronization counter. The communication control method includes: repeating, by the communication master, transmission of first information indicating a counter value of the synchronization counter of the communication master to the one or more communication slaves through a network; updating the counter value of the synchronization counter of each of the one or more communication slaves based on the received first information when each of the one or more communication slaves receives the first information from the communication master; managing, by the communication master, a total number of pieces of the first information transmitted for each of the one or more communication slaves; and estimating, by the communication master, synchronization accuracy with respect to the communication master for each communication slave based on a number of transmissions of the first information for each communication slave.

According to still another example of the present invention, there is provided a control device that functions as a communication master connected to one or more communication slaves through a network. The control device includes a synchronization counter and means configured to repeat transmission of first information indicating a counter value of the synchronization counter of the control device to the one or more communication slaves through a network. Each of the one or more communication slaves updates the counter value of a synchronization counter of each of the one or more communication slaves based on the received first information upon receiving the first information. The control device includes means configured to manage a total number of pieces of the first information transmitted for each of the one or more communication slaves and estimate synchronization accuracy with respect to the communication master for each communication slave based on a number of transmissions of the first information for each communication slave.

Advantageous Effects of Invention

According to the present invention, it is possible to appropriately manage synchronization accuracy in a control system including a communication master and one or more communication slaves.

DESCRIPTION OF EMBODIMENT

Figure 1:
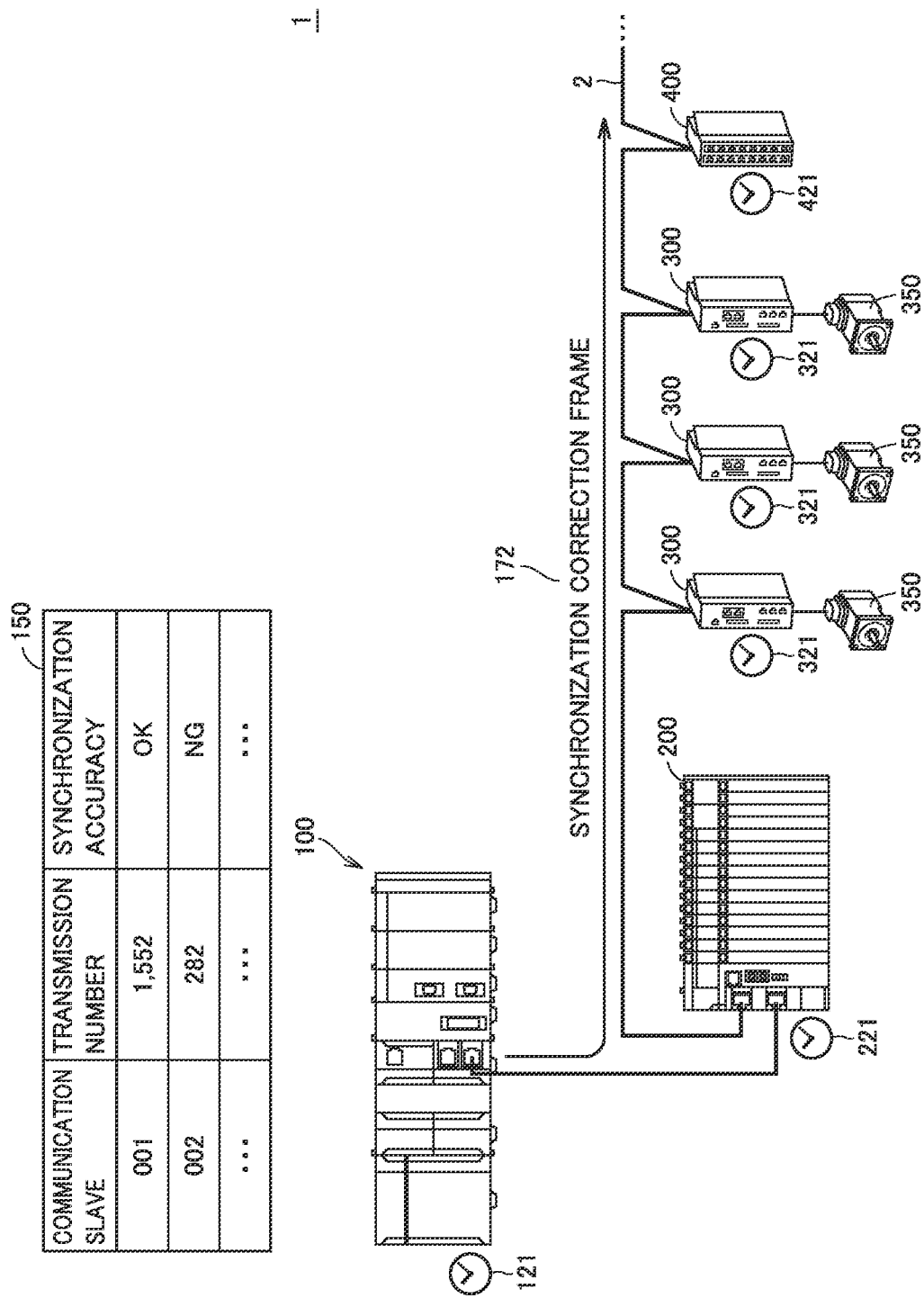
FIG. 1 is a schematic diagram illustrating an overall configuration example of a control system according to an embodiment.

With reference to the drawings, an embodiment of the present invention will be described in detail. The same or equivalent portion in the drawings is denoted by the same reference numeral, and the description will not be repeated.

A. Application Example

With reference to FIG. 1, an example of a scene to which the present invention is applied will be described.

FIG. 1 is a schematic diagram illustrating an overall configuration example of a control system 1 according to an embodiment. With reference to FIG. 1, control system 1 includes a control device 100 that functions as a communication master and one or more communication slaves network-connected to control device 100 through a field network 2 as main components. As an example of the communication slave, FIG. 1 illustrates a remote IO device 200, a servo driver 300, and a safety IO device 400. Each of servo drivers 300 is connected to a servomotor 350 as a control target.

In the present specification, the "field network" is a generic term of communication media (including both wired and wireless) that can establish the synchronization between connected devices (nodes). The "field network" is also referred to as a "field bus". Typically, a protocol for an industrial device in which a data arrival time between the nodes in the network is guaranteed may be adopted as field network 2. For example, EtherCAT (registered trademark) can be adopted as the protocol in which the data arrival time between the nodes is guaranteed. Alternatively, EtherNet/IP (registered trademark), DeviceNet (registered trademark), CompoNet (registered trademark), or the like may be adopted. In the following description, the case where EtherCAT is adopted as field network 2 will be described as an example.

In the present specification, the "communication master" or the "master" is a term that collectively refers to an entity or a function that manages data transmission in the target field network. The term "communication slave" or "slave" is used as a term paired with the communication master or the master. In the present specification, the communication slave or the slave is a term that collectively refers to the entity or the function that performs data transmission under the control of the communication master or the master while being disposed in the target field network.

The functions, types, and the like of the communication master and the communication slave are not limited at all, but any device can be used.

In the present specification, the "functional unit" is a generic term for a device that configures a part of control device 100 and/or remote IO device 200 to provide a specific function. Typically, the functional unit includes an IO unit that exchanges various signals with the control target, a special unit responsible for proportional integral derivative (PID) control, and a special unit responsible for motion control.

Typically, for example, the IO unit has one or more functions among a digital input (DI) function of receiving a digital signal (binary of ON and OFF) from the control target, a digital output (DO) function of outputting the digital signal to the control target, an analog input (AI) function of receiving an analog signal from the control target, and an analog output (AO) function of outputting the analog signal to the control target.

As illustrated in FIG. 1, each of the communication master (control device 100) and one or more communication slaves (remote IO device 200, servo driver 300, safety IO device 400, and the like) includes synchronization counters 121, 221, 321, 421 that achieve the synchronization control.

The communication master (control device 100) repeatedly transmits first information indicating the counter value of synchronization counter 121 of the communication master (control device 100) to one or more communication slaves through field network 2. Typically, the first information may be embodied as a control frame (hereinafter, also referred to as a "synchronization correction frame 172") including a time stamp (normally, an elapsed time from a predetermined reference time) held by synchronization counter 121 of the communication master (control device 100).

Upon receiving the first information (synchronization correction frame 172) from the communication master, each of one or more communication slaves updates the counter value of each of synchronization counters 121, 221, 321, 421 based on the received first information. As described above, synchronization correction frame 172 is used to match the counter values between synchronization counter 121 of the communication master and synchronization counters 221, 321, 421 of each communication slave.

Each communication slave corrects the counter values of synchronization counters 221, 321, 421 based on received synchronization correction frame 172, so that the synchronization accuracy is enhanced as the total number of received synchronization correction frames 172 increases. Conversely, when the total number of received synchronization correction frames 172 is small, it means that the sufficient synchronization accuracy cannot be secured.

Accordingly, the communication master (control device 100) manages the total number of pieces of the first information (synchronization correction frames 172) transmitted for each of one or more communication slaves, and estimates the synchronization accuracy with respect to the communication master for each communication slave based on the number of transmissions of the first information (synchronization correction frames 172) for each communication slave. As an example, the communication master (control device 100) includes the total number of synchronization correction frames 172 transmitted for each communication slave and a synchronization accuracy management table 150 managing the synchronization accuracy, and can sequentially update the value of synchronization accuracy management table 150 and implement the management of the synchronization accuracy in control system 1.

B. Hardware Configuration Example

A hardware configuration example of main components constituting control system 1 of the embodiment will be described below.

(b1: Control Device 100)

Figure 2:
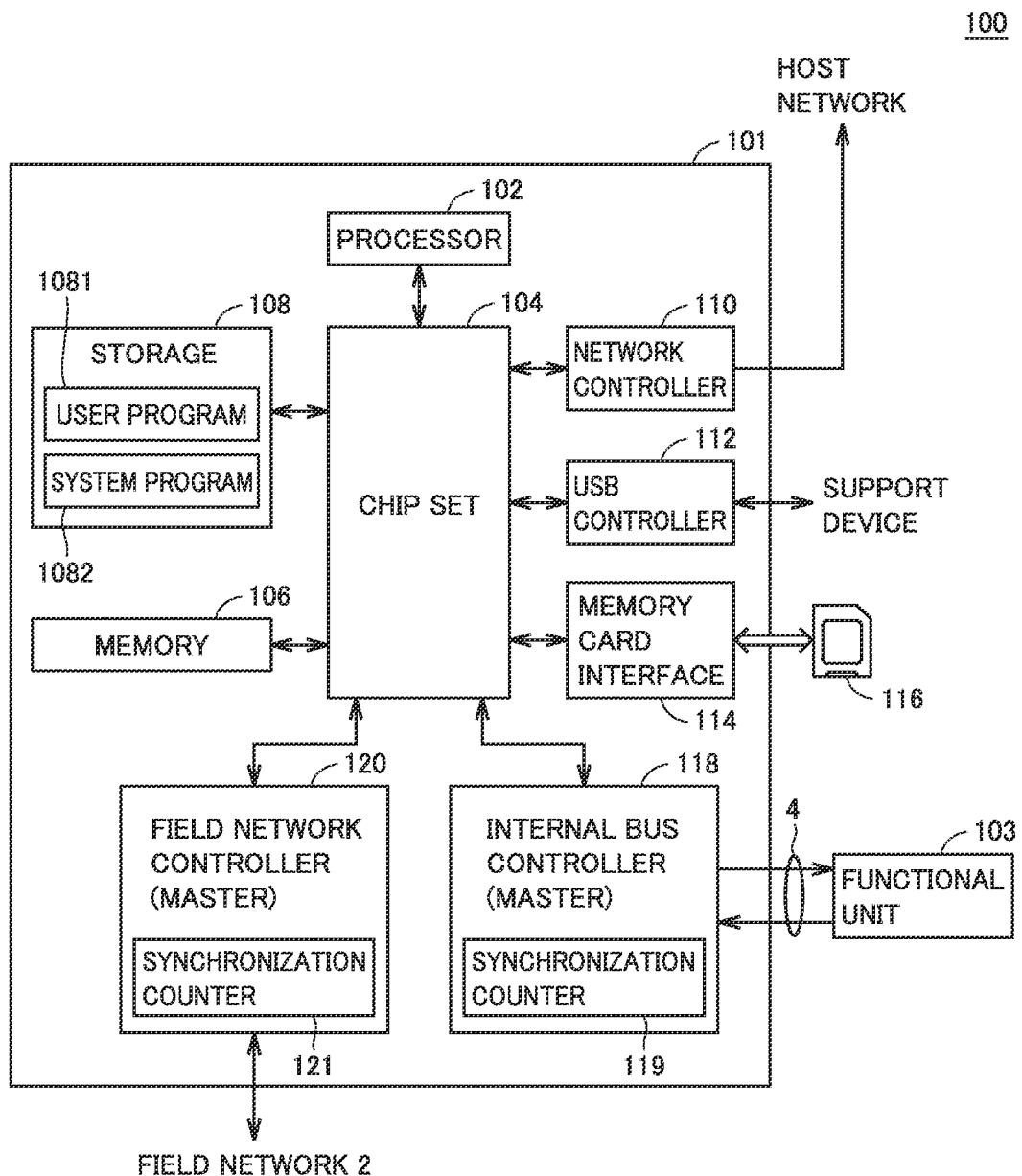
FIG. 2 is a block diagram illustrating a hardware configuration example of a control device configuring the control system according to the embodiment.

FIG. 2 is a block diagram illustrating the hardware configuration example of control device 100 configuring control system 1 according to the embodiment. With reference to FIG. 2, control device 100 includes a processing unit 101 and a functional unit 103. Processing unit 101 includes a processor 102, a chip set 104, a memory 106, a storage 108, a network controller 110, a universal serial bus (USB) controller 112, a memory card interface 114, an internal bus controller 118, and a field network controller 120.

Processor 102 corresponds to an arithmetic processing unit that executes a control arithmetic operation and the like, and includes a CPU, an MPU, and a GPU. Specifically, processor 102 reads a program (as an example, a system program 1082 and a user program 1081) stored in storage 108, expands the program in memory 106, and executes the program, thereby implementing the control according to the control target and various pieces of processing. That is, control device 100 can execute user program 1081 that is arbitrarily produced.

Storage 108 is configured of a nonvolatile storage device such as a hard disk drive (HDD) or a solid state drive (SSD).

Memory 106 is configured of a dynamic random access memory (DRAM), a static random access memory (SRAM), or the like.

Chip set 104 implements the processing of control device 100 as a whole by controlling processor 102 and each device.

In addition to system program 1082 implementing a basic function, user program 1081 produced according to the control target such as a facility or a machine is stored in storage 108.

Network controller 110 exchanges data with an additional information processing device such as a gate way or a database server through a host network (not illustrated). USB controller 112 exchanges the data with a support device through USB connection.

Memory card interface 114 is configured such that a memory card 116 is detachably attached, and memory card interface 114 can write the data in memory card 116 and read various data (user program 1081, trace data, and the like) from memory card 116.

Internal bus controller 118 corresponds to a communication interface electrically connecting one or more functional units 103 and processing unit 101 through an internal bus 4. Internal bus controller 118 functions as the communication master performing the synchronization control through the internal bus.

Field network controller 120 corresponds to the communication interface electrically connecting the device functioning as one or more communication slaves to processing unit 101 through field network 2. Field network controller 120 functions as the communication master performing the synchronization control through field network 2.

Internal bus controller 118 includes a synchronization counter 119 that implements the synchronization control, and field network controller 120 includes a synchronization counter 121 that implements the synchronization control. Synchronization counter 119 and synchronization counter 121 store a time stamp (normally, an elapsed time from a predetermined reference time) held by the communication master. Synchronization counter 119 and synchronization counter 121 are used as time used to determine various timings implementing the synchronization control. For example, synchronization counter 119 and synchronization counter 121 may be mounted using a high precision event timer (HPET), or may be mounted using a dedicated circuit such as an application specific integrated circuit (ASIC) or a field-programmable gate array (FPGA).

Although the configuration example in which the required functions of implementing control device 100 are provided by processor 102 executing the program has been described in FIG. 2, some or all of these provided functions may be mounted using a dedicated hardware circuit (for example, ASIC or FPGA). Alternatively, a main part of control device 100 may be implemented using hardware (for example, an industrial personal computer based on a general-purpose personal computer) according to a general-purpose architecture. In this case, a plurality of operating systems (OSs) having different uses may be executed in parallel using a virtualization technology, and the necessary application may be executed on each OS.

Furthermore, a configuration in which functions such as a display device and a support device are integrated with control device 100 may be adopted.

(b2: Remote IO Device 200)

Figure 3:
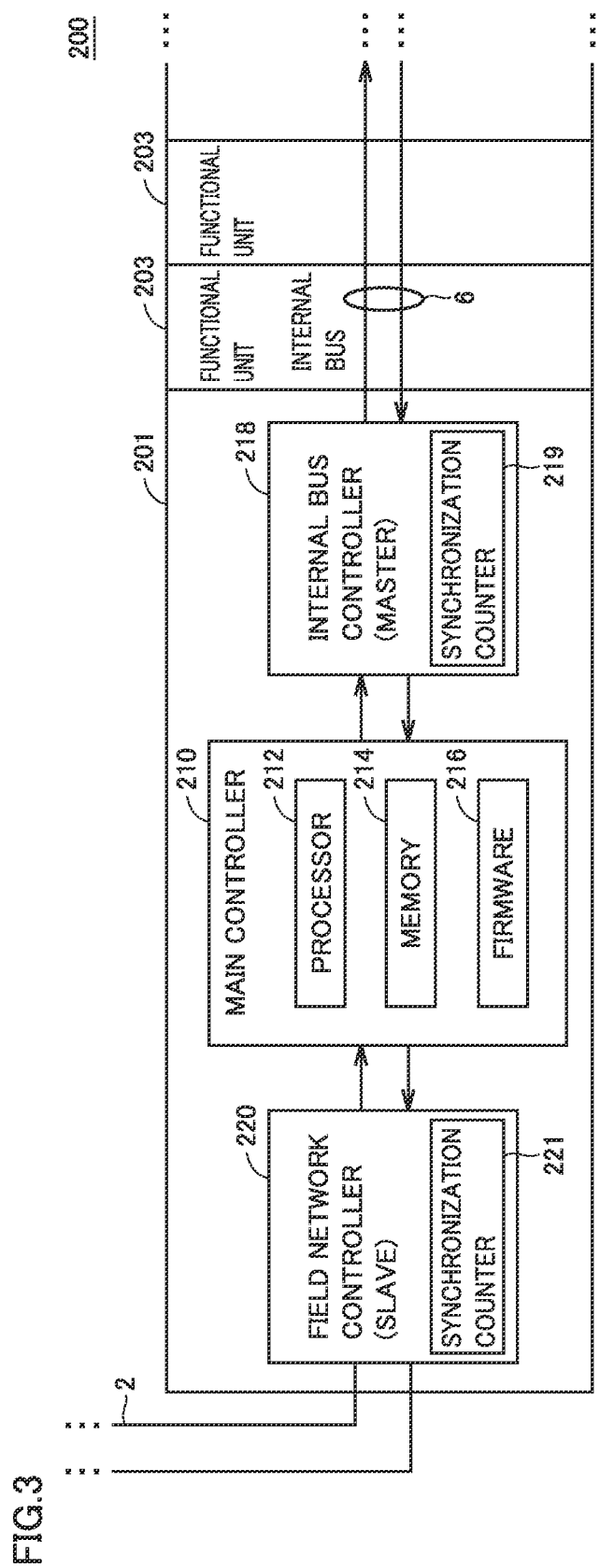
FIG. 3 is a block diagram illustrating a hardware configuration example of a remote IO device configuring the control system according to the embodiment.

FIG. 3 is a block diagram illustrating a hardware configuration example of remote IO device 200 configuring control system 1 according to the embodiment. With reference to FIG. 3, remote IO device 200 includes a coupler unit 201 and a functional unit 203. Coupler unit 201 includes a field network controller 220, a main controller 210, and an internal bus controller 218.

Field network controller 220 corresponds to the communication interface electrically connecting remote IO device 200 and control device 100 through field network 2. Field network controller 220 functions as the communication slave participating in synchronization control through field network 2. Field network controller 220 includes a synchronization counter 221 that implements the synchronization control. Field network controller 220 updates the value stored in synchronization counter 221 based on a frame for synchronization establishment from control device 100 functioning as the communication master. Synchronization counter 221 may adopt the configuration similar to that of synchronization counter 119 or synchronization counter 121.

Main controller 210 includes a processor 212, a memory 214, and firmware 216. Processor 212 corresponds to an arithmetic processing unit that executes the control arithmetic processing and the like, and includes a CPU, an MPU, and a GPU. Specifically, processor 212 reads firmware 216 stored in the storage, expands firmware 216 in memory 214, and executes firmware 216, thereby implementing data transfer between field network controller 220 and internal bus controller 218, exchanging the signal between functional unit 203 and the field device, and the like.

Internal bus controller 218 corresponds to a communication interface electrically connecting one or more functional units 203 and coupler unit 201 through an internal bus 6. Internal bus controller 218 functions as the communication master performing the synchronization control through internal bus 6. Internal bus controller 218 includes a synchronization counter 219 implementing the synchronization control. Synchronization counter 219 may adopt a configuration similar to that of synchronization counter 119 or synchronization counter 121.

(b3: Servo Driver 300)

Figure 4:
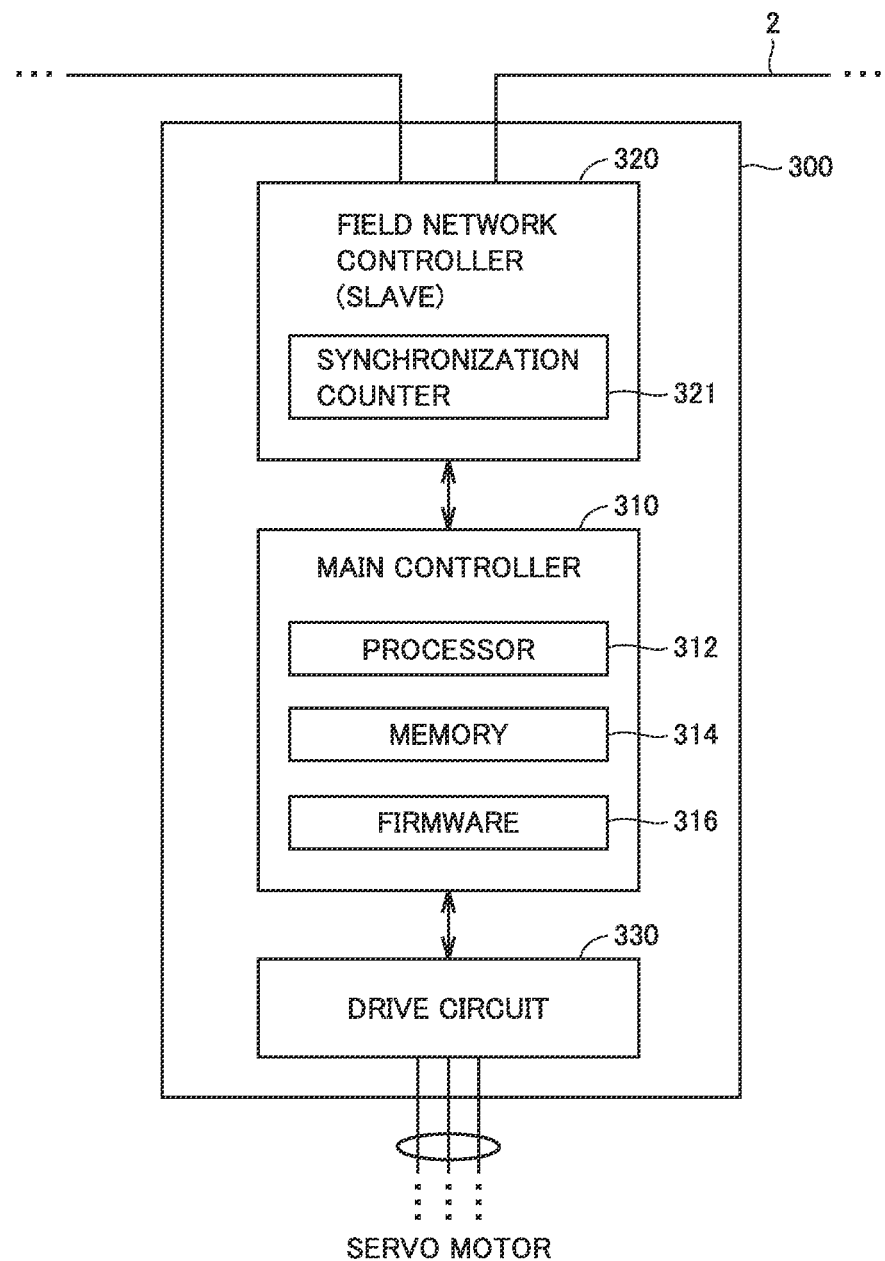
FIG. 4 is a block diagram illustrating a hardware configuration example of a servo driver configuring the control system according to the embodiment.

FIG. 4 is a block diagram illustrating a hardware configuration example of servo driver 300 configuring control system 1 according to the embodiment. With reference to FIG. 4, the servo driver 300 includes a field network controller 320, a main controller 310, and a drive circuit 330.

Field network controller 320 corresponds to the communication interface electrically connecting servo driver 300 and control device 100 through field network 2. Field network controller 320 functions as the communication slave participating in the synchronization control through field network 2. Field network controller 320 includes a synchronization counter 321 that implements the synchronization control. Field network controller 320 updates the value stored in synchronization counter 321 based on the frame for synchronization establishment from control device 100 functioning as the communication master. Synchronization counter 321 may adopt the configuration similar to that of synchronization counter 119 or synchronization counter 121.

Main controller 310 includes a processor 312, a memory 314, and firmware 316. Processor 312 corresponds to the arithmetic processing unit that executes the control arithmetic processing and the like, and includes a CPU, an MPU, and a GPU. Specifically, processor 312 reads firmware 316 stored in the storage, expands firmware 316 in memory 314, and executes firmware 316, thereby implementing the data transfer between field network controller 320 and main controller 310, controlling drive circuit 330, and the like.

Drive circuit 330 drives electrically-connected servomotor 350 according to an internal command from main controller 310, and responds a state value of servomotor 350 and the like to main controller 310.

(b4: Safety IO Device 400)

Safety IO device 400 is in charge of acquisition of an input signal used for the safety control and/or generation of an output signal. The basic configuration is similar to remote IO device 200, and the detail description is not performed herein.

Safety IO device 400 also includes the synchronization counter that implements the synchronization control, and updates the value stored in the synchronization counter based on the frame for synchronization establishment from control device 100 functioning as the communication master.

C. Synchronization Establishment

A communication control method including the synchronization establishment between the communication master and one or more plurality of communication slaves in control system 1 of the embodiment will be described below.

Figure 5:
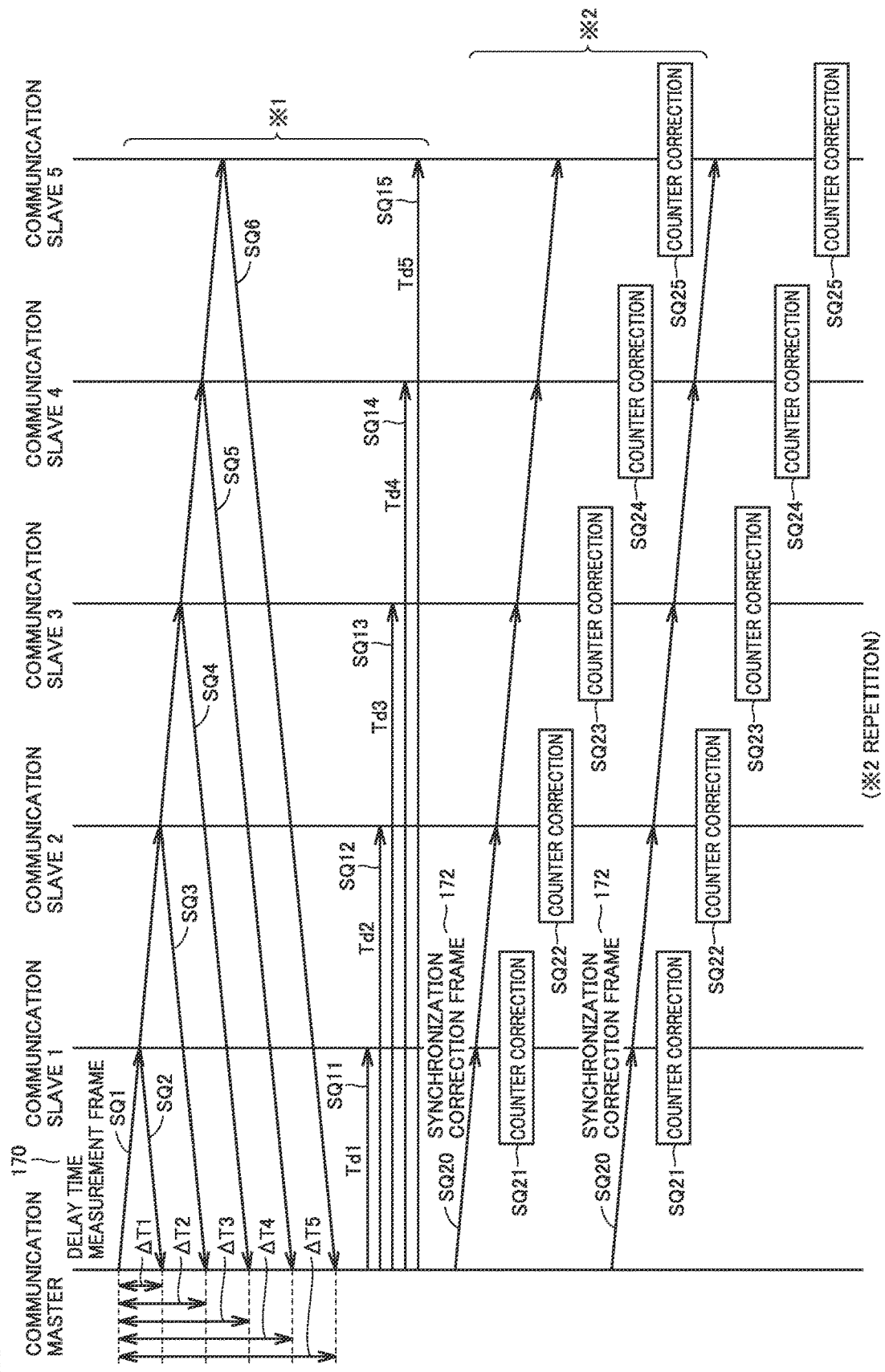
FIG. 5 is a sequence diagram illustrating a processing procedure of establishing synchronization in the control system according to the embodiment.

FIG. 5 is a sequence diagram illustrating a processing procedure of establishing the synchronization in control system 1 according to the embodiment. With reference to FIG. 5, the processing procedure of establishing the synchronization typically includes propagation delay time measurement processing (*1 in FIG. 5) and synchronization counter update processing (*2 in FIG. 5). Basically, the synchronization counter update processing is repeatedly executed.

A propagation delay time between the communication master and each communication slave is measured in the propagation delay time measuring processing. At this point, the propagation delay time means a time required for an arbitrary frame to be propagated from the communication master to the communication slave. As will be described later, processing (synchronization counter update processing) of matching the values of the synchronization counters between the communication master and each communication slave is executed in consideration of the propagation delay time.

More specifically, the communication master transmits a control frame (hereinafter, also referred to as a "delay time measurement frame 170") measuring the propagation delay time to each of the connected communication slaves (sequence SQ1).

Upon receiving delay time measurement frame 170 from the communication master, each communication slave returns received delay time measurement frame 170 to the communication master (sequences SQ2 to SQ6). Upon receiving delay time measurement frame 170 returned from each communication slave, the communication master measures elapsed times ΔT1 to ΔT5 from the timing at which delay time measurement frame 170 is previously transmitted.

Elapsed times ΔT1 to ΔT5 mean the time required for delay time measurement frame 170 to reciprocate between the communication master and each communication slave. Propagation delay times Td1 to Td5 between the communication master and each communication slave can be determined based on a half of elapsed times ΔT1 to ΔT5. The communication master notifies each communication slave of corresponding propagation delay times Td1 to Td5 (sequences SQ11 to SQ15).

Each communication slave stores the propagation delay time notified from the communication master, and the propagation delay time measurement processing is completed.

For convenience of the description, the measurement and the calculation of the elapsed time and the propagation delay time are described in a simplified manner. In practice, because the times for frame reception processing, analysis processing, transmission processing, and the like are required, the propagation delay time may be determined in consideration of such times.

Furthermore, when the communication slave is newly added to the field network, the propagation delay time measurement processing may be executed between the communication master and the newly-added communication slave.

Because the processing related to the measurement or the determination of the propagation delay time is known, no further detail description will be given here.

Subsequently to the propagation delay time measurement processing, the synchronization counter update processing is executed. In the synchronization counter update processing, the communication master repeatedly sends the control frame (synchronization correction frame 172) matching the counter values between the synchronization counter of the communication master and the synchronization counter of each communication slave to field network 2 (sequence SQ20).

That is, the communication master repeats transmission of the first information (synchronization correction frame 172) indicating the counter value of synchronization counter 121 of the communication master to one or more communication slaves through field network 2.

Synchronization correction frame 172 stores the counter value (that is, the time stamp indicating the current time of the communication master) of the synchronization counter of the communication master at the timing when the communication master sends synchronization correction frame 172. When each communication slave receives synchronization correction frame 172 from the communication master, the error (hereinafter, also referred to as a "synchronization error") between the counter value of the synchronization counter of the communication master and the counter value of the synchronization counter of the communication slave is calculated based on the counter value (the time stamp of the communication master) stored in received synchronization correction frame 172 and the propagation delay time acquired in advance. Then, each communication slave corrects the counter value of the synchronization counter of each communication slave based on the calculated synchronization error (sequences SQ21 to SQ25). That is, each communication slave has a function of updating the counter value of the synchronization counter based on received synchronization correction frame 172 (first information) upon receiving synchronization correction frame 172 from the communication master.

The transmission of synchronization correction frame 172 and the correction of the counter value of the synchronization counter in each communication slave are repeatedly executed in a predetermined cycle or every predetermined event.

Figure 6:
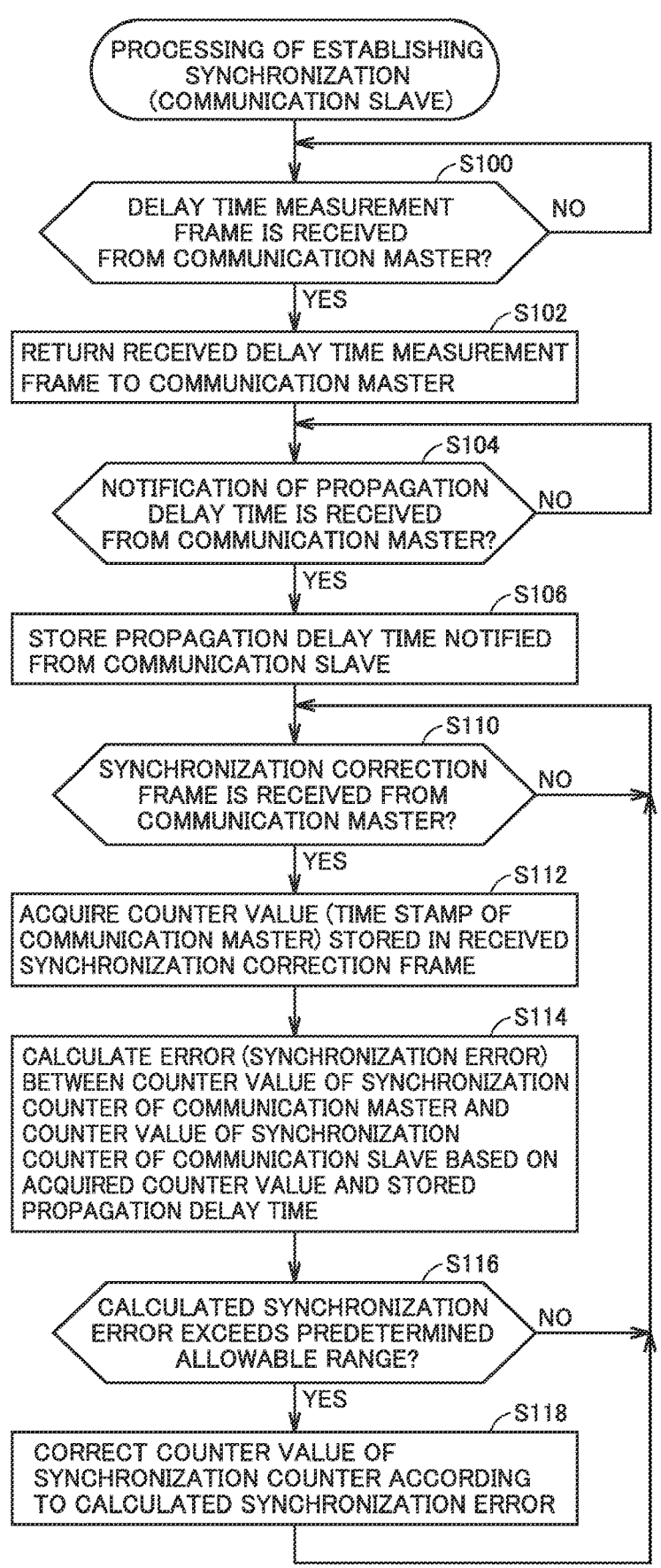
FIG. 6 is a flowchart illustrating a processing procedure in a communication slave establishing the synchronization in the control system according to the embodiment.

FIG. 6 is a flowchart illustrating a processing procedure in the communication slave establishing the synchronization in control system 1 according to the embodiment. Each step in FIG. 6 is executed by the main controller (such as main controller 210 in FIG. 3 and main controller 310 in FIG. 4) of the communication slave when the communication slave is connected to field network 2.

With reference to FIG. 6, when the communication slave is connected to the field network, the communication slave waits for the reception of delay time measurement frame 170 from the communication master. That is, the communication slave determines whether or not delay time measurement frame 170 is received from the communication master (step S100). When receiving delay time measurement frame 170 from the communication master (YES in step S100), the communication slave returns received delay time measurement frame 170 to the communication master (step S102).

When delay time measurement frame 170 is not received from the communication master (NO in step S100), the processing in step S100 is repeated.

Subsequently, the communication slave waits for notification of the propagation delay time from the communication master. That is, the communication slave determines whether or not the notification of the propagation delay time is received from the communication master (step S104). When receiving the notification of the propagation delay time from the communication master (YES in step S104), the communication slave stores the propagation delay time notified from the communication slave (step S106). When the propagation delay time is not notified from the communication master (NO in step S104), the processing in step S104 is repeated.

Through the above procedure, the propagation delay time measurement processing is completed, and the synchronization counter update processing is started.

In the synchronization counter update processing, the communication slave corrects the counter value of the synchronization counter based on synchronization correction frame 172. That is, the communication slave determines whether or not synchronization correction frame 172 is received from the communication master (step S110). When synchronization correction frame 172 is received from the communication master (YES in step S110), the communication slave acquires the counter value (the time stamp of the communication master) stored in received synchronization correction frame 172 (step S112), and calculates the error (synchronization error) between the counter value of the synchronization counter of the communication master and the counter value of the synchronization counter of the communication slave based on the acquired counter value and the propagation delay time stored in step S106 (step S114). As described above, upon receiving synchronization correction frame 172 (first information) from the communication master, each of the one or more communication slaves execute processing of updating the counter value of the synchronization counter of each communication slave based on received synchronization correction frame 172. At this point, the counter value of the synchronization counter is updated based on synchronization correction frame 172 (first information) received from the communication master and the propagation delay time acquired in advance.

When synchronization correction frame 172 is not received from the communication master (NO in step S110), the processing in step S110 is repeated.

Then, the communication slave determines whether or not the synchronization error calculated in step S114 exceeds a predetermined allowable range (step S116). When the synchronization error exceeds the predetermined allowable range (YES in step S116), the communication slave corrects the counter value of the synchronization counter according to the calculated synchronization error (step S118). Then, the pieces of processing from step S110 are repeated. When the synchronization error falls within the predetermined allowable range (NO in step S116), the processing in step S118 is skipped, and the pieces of processing from step S110 are repeated.

The synchronization establishment processing in the communication slave is executed by the above processing procedure.

As described with reference to FIGS. 5 and 6, each communication slave corrects the counter value of the synchronization counter based on received synchronization correction frame 172, so that the synchronization accuracy is enhanced as the total number of received synchronization correction frames 172 increases. Conversely, when the total number of received synchronization correction frames 172 is small, it means that the sufficient synchronization accuracy cannot be secured.

Figure 7:
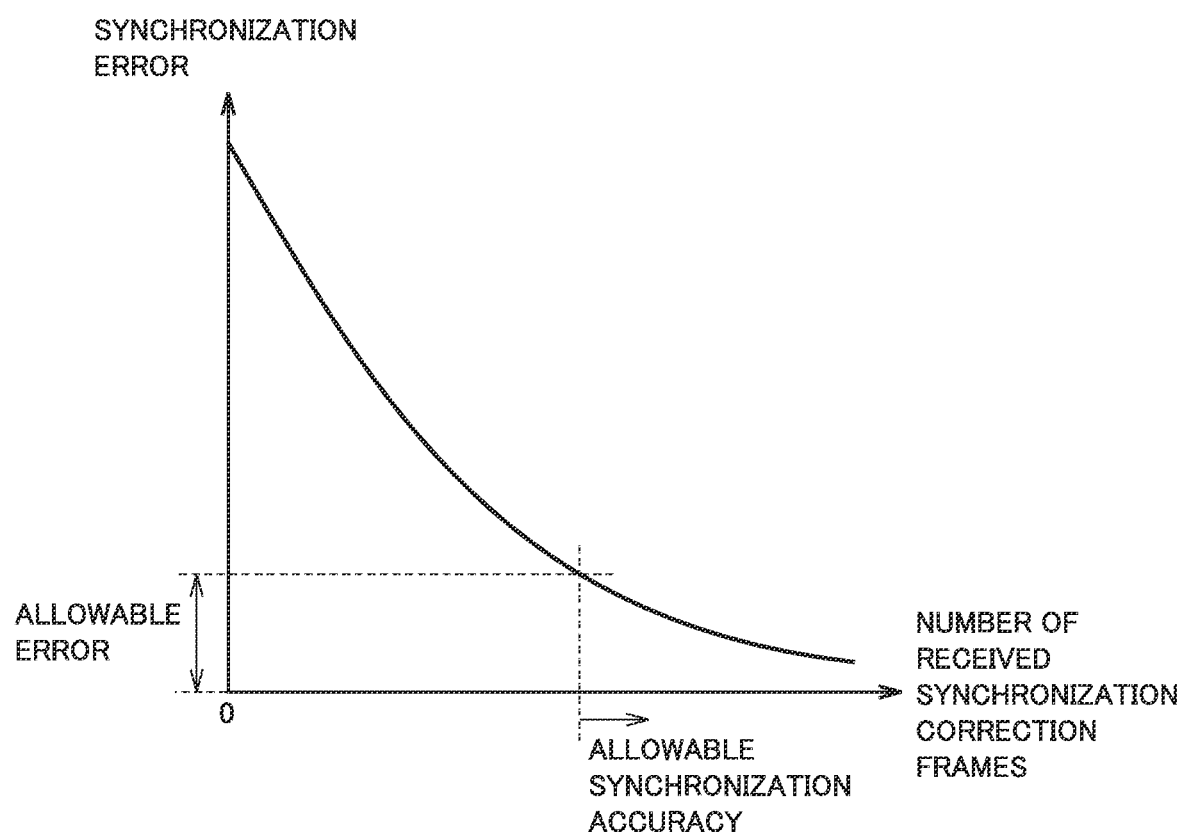
FIG. 7 is a view illustrating an example of a relationship between the number of synchronization correction frames and a synchronization error in the control system according to the embodiment.

FIG. 7 is a view illustrating an example of a relationship between the number of synchronization correction frames 172 and the synchronization error in control system 1 according to the embodiment. With reference to FIG. 7, the synchronization error decreases as the number of received synchronization correction frames 172 in each communication slave increases. When the synchronization error is within a range of a predetermined allowable error, it can be determined that allowable synchronization accuracy is secured.

That is, even when the communication master cannot acquire magnitude of the synchronization error in each communication slave, the synchronization accuracy in each communication slave can be estimated by managing the total number of synchronization correction frames 172 transmitted from the communication master to each communication slave.

Control system 1 of the embodiment manages the total number of synchronization correction frames 172 transmitted from the communication master to each communication slave to achieve grasping and control of the synchronization accuracy in each communication slave.

D. Management of Synchronization Accuracy

In control system 1 of the first embodiment, the communication master manages the synchronization accuracy of each communication slave based on the number of transmitted synchronization correction frames 172.

Figure 8:
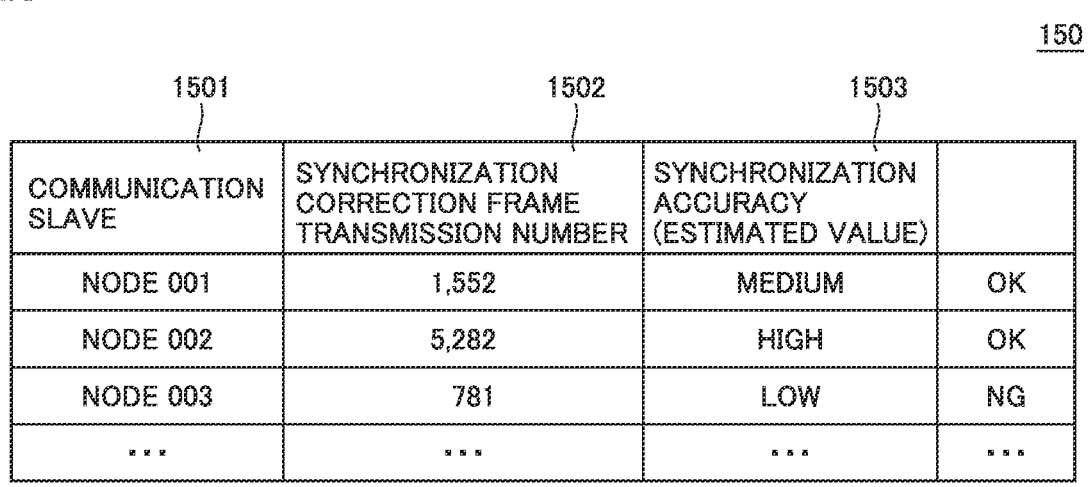
FIG. 8 is a view illustrating processing of managing synchronization accuracy of each communication slave by a communication master in the control system according to the embodiment.

FIG. 8 is a view illustrating processing of managing the synchronization accuracy of each communication slave by the communication master in control system 1 according to the embodiment. FIG. 8 illustrates an example of synchronization accuracy management table 150 held by the communication master.

Synchronization accuracy management table 150 in FIG. 8 includes communication slave identification information 1501, a synchronization correction frame transmission number 1502, and synchronization accuracy 1503.

For example, identification information (typically, the node address) of each communication slave in field network 2 is used as communication slave identification information 1501. Synchronization correction frame transmission number 1502 stores the total number of synchronization correction frames 172 transmitted from the communication master after each communication slave is connected to field network 2. The total number of synchronization correction frames 172 means the number of transmissions from the communication master after each communication slave is connected to field network 2, and the timing at which the communication slave is newly connected to field network 2 becomes zero. A value (for example, "high", "medium", "low", and the like) indicating the estimated synchronization accuracy is stored in synchronization accuracy 1503 based on the total number of synchronization correction frames 172 stored in synchronization correction frame transmission number 1502 of each communication slave.

The communication master may determine the synchronization accuracy of any of the communication slaves based on the number of transmissions of synchronization correction frame 172 for that communication slave with respect to a predetermined number of transmissions. For example, an estimated value stored in synchronization accuracy 1503 may be determined by comparing the total number of corresponding synchronization correction frames 172 with a predetermined evaluation criterion.

Not only the stepwise estimated value as illustrated in FIG. 8 but also a specific numerical value (for example, a value in the range of 0 to 100%) may be adopted as synchronization accuracy 1503. In this case, the evaluation can be made in the form of an arrival rate of the actually-received synchronization correction frame transmission number 1502 with respect to synchronization correction frame transmission number 1502 required for ensuring the required synchronization accuracy.

Figure 9:
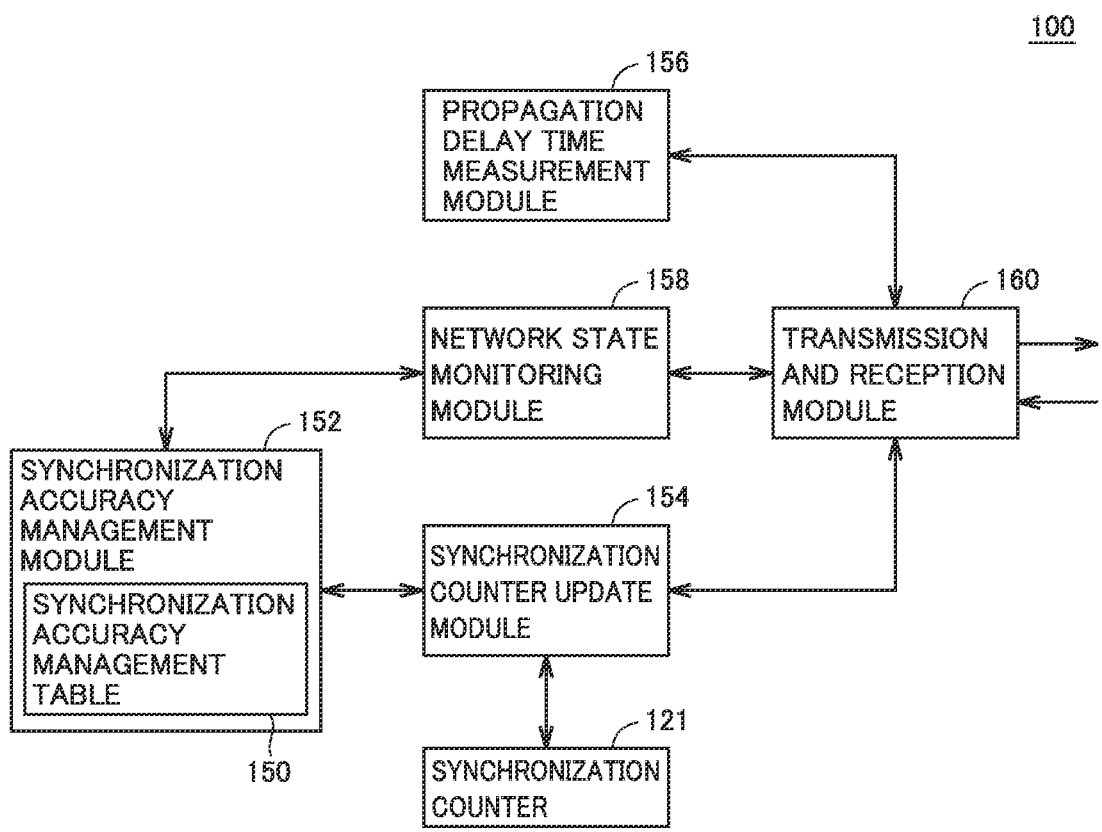
FIG. 9 is a schematic diagram illustrating a functional configuration example for the management of the synchronization accuracy of each communication slave by the communication master in the control system according to the embodiment.

FIG. 9 is a schematic diagram illustrating a functional configuration example for the management of the synchronization accuracy of each communication slave by the communication master in control system 1 of the embodiment. Typically, the functional configuration in FIG. 9 may be implemented by processor 102 of control device 100 functioning as the communication master executing system program 1082, or all or a part of the functional configuration may be implemented in field network controller 120.

With reference to FIG. 9, control device 100 includes a transmission and reception module 160, a network state monitoring module 158, a propagation delay time measurement module 156, a synchronization counter update module 154, and a synchronization accuracy management module 152 as functional configurations related to the management of the synchronization accuracy.

Transmission and reception module 160 is responsible for processing related to the transmission of the frame to field network 2 and the reception of the frame through field network 2.

Network state monitoring module 158 specifies the communication slave connected to field network 2 and manages the connection state including the separation of the communication slave from field network 2.

Propagation delay time measurement module 156 is responsible for propagation delay time measuring processing such as the sending of delay time measuring frame 170 to each communication slave and the reception of delay time measuring frame 170 responded from each communication slave.

Synchronization counter update module 154 is responsible for synchronization counter update processing such as the generation and the transmission of synchronization correction frame 172 referring to synchronization counter 121. More specifically, synchronization counter update module 154 repeats the transmission of synchronization correction frame 172 (first information) indicating the counter value of synchronization counter 121 of the communication master to one or more communication slaves through field network 2.

Synchronization accuracy management module 152 manages the total number of synchronization correction frames 172 transmitted in response to the command from synchronization counter update module 154 for each communication slave based on the connection state of each communication slave in field network 2 managed by network state monitoring module 158. Synchronization accuracy management module 152 stores the total number of synchronization correction frames 172 for each communication slave in synchronization accuracy management table 150. In addition, synchronization accuracy management module 152 determines or updates the synchronization accuracy for each communication slave based on the total number of synchronization correction frames 172 for each communication slave stored in synchronization accuracy management table 150. Furthermore, synchronization accuracy management module 152 may update a value of a system variable that can be referred to by a user program as described later based on the determined synchronization accuracy for each communication slave.

As described above, synchronization accuracy management module 152 manages the total number of the synchronization correction frames 172 (first information) transmitted for each of one or more communication slaves, and estimates the synchronization accuracy with respect to the communication master for each communication slave based on the number of transmissions of synchronization correction frames 172 (first information) for each communication slave.

A processing procedure related to the management of the synchronization accuracy in the communication master will be described below.

Figure 10:
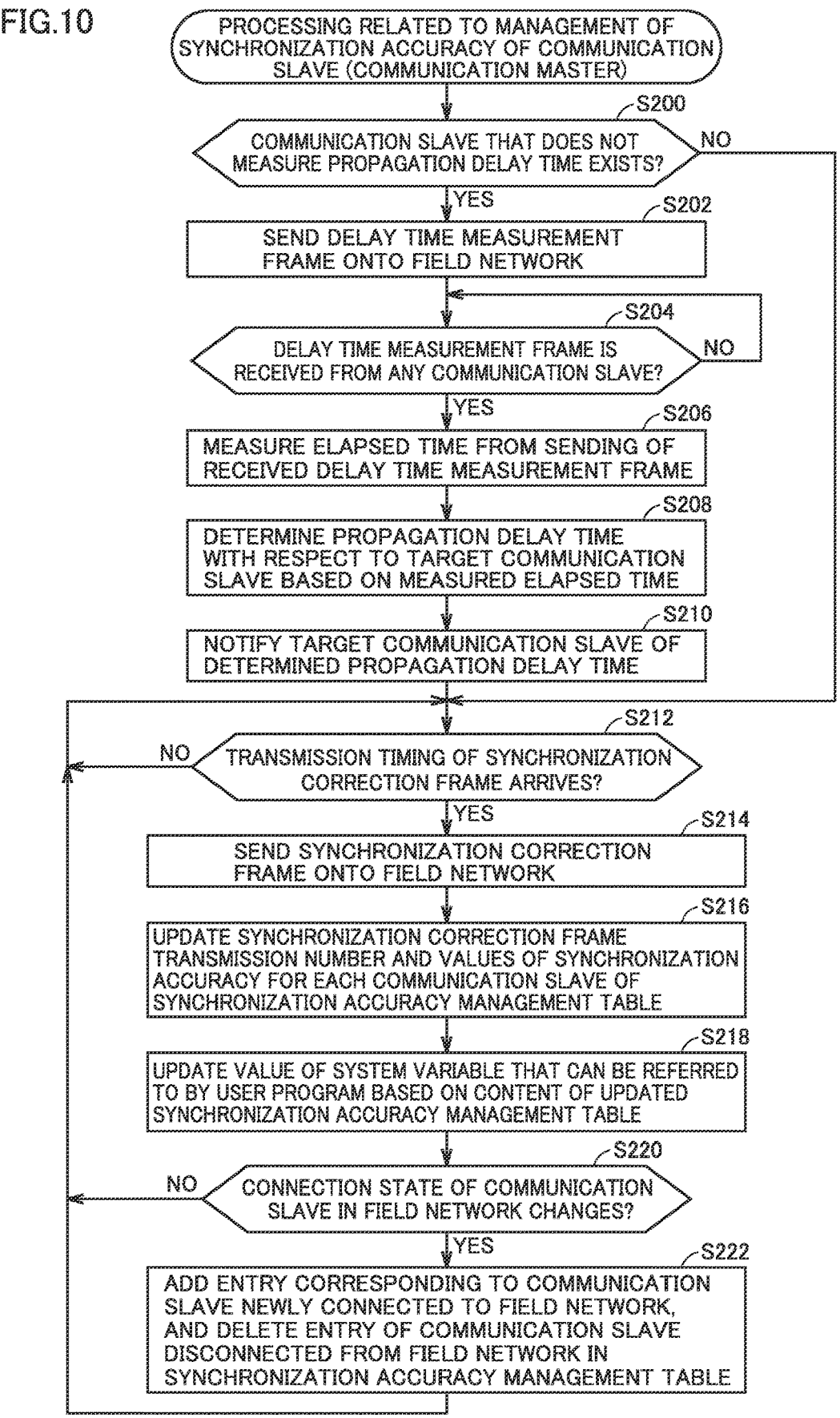
FIG. 10 is a flowchart illustrating a processing procedure related to the management of the synchronization accuracy of each communication slave by the communication master in the control system according to the embodiment.

FIG. 10 is a flowchart illustrating the processing procedure related to the management of the synchronization accuracy of each communication slave by the communication master in control system 1 according to the embodiment. Typically, each step in FIG. 10 may be implemented by processor 102 of control device 100 functioning as the communication master executing system program 1082, or field network controller 120 may execute all or part of the processing.

With reference to FIG. 10, the communication master determines whether or not the communication slave that does not measure the propagation delay time exists (step S200). When the communication slave that does not measure the propagation delay time detects, for example, a communication slave newly connected to field network 2, the communication master determines the newly-connected communication slave as the communication slave that does not measure the propagation delay time.

When the communication slave that does not measure the propagation delay time exists (YES in step S200), the communication master sends delay time measurement frame 170 onto field network 2 (step S202). Then, the communication master waits for transmitted delay time measurement frame 170 to be returned from any communication slave. That is, the communication master determines whether or not delay time measurement frame 170 is received from any communication slave (step S204).

When receiving delay time measurement frame 170 from any communication slave (YES in step S204), the communication master measures the elapsed time from the sending of received delay time measurement frame 170 (step S206), and determines the propagation delay time with respect to the target communication slave based on the measured elapsed time (step S208). Then, the communication master notifies the target communication slave of the determined propagation delay time (step S210).

The pieces of processing in steps S206 to S210 are repeatedly executed by the number of delay time measurement frames 170 returned from the communication slave.

On the other hand, when delay time measurement frame 170 is not received from any communication slave (NO in step S204), the processing in step S204 is repeated.

When the communication slave that does not measure the propagation delay time does not exist (NO in step S200), the pieces of processing in steps S202 to S210 are skipped.

Subsequently, the communication master determines whether or not the transmission timing of synchronization correction frame 172 arrives (step S212). When the sending timing of synchronization correction frame 172 does not arrive (NO in step S212), the processing of step S212 is repeated.

When the transmission timing of synchronization correction frame 172 arrives (YES in step S212), the communication slave sends synchronization correction frame 172 onto field network 2 (step S214). Then, the communication master updates synchronization correction frame transmission number 1502 and the value of synchronization accuracy 1503 for each communication slave of synchronization accuracy management table 150 (see FIG. 8) (step S216). As described above, the communication master executes the processing of managing the total number of synchronization correction frames 172 (first information) transmitted for each of one or more communication slaves, and executes the processing of estimating the synchronization accuracy with respect to the communication master for each communication slave based on the number of transmissions of synchronization correction frames 172 (first information) for each communication slave.

Furthermore, the communication master updates the value of the system variable that can be referred to by the user program based on a content of updated synchronization accuracy management table 150 (step S218).

Subsequently, the communication master determines whether or not the connection state of the communication slave in field network 2 changes (step S220). That is, whether presence or absence of the change in the connection state is determined, such as a new communication slave being connected to field network 2 or any communication slave being disconnected from field network 2.

When the connection state of the communication slave in field network 2 changes (YES in step S220), the communication master adds an entry corresponding to the communication slave newly connected to field network 2 and deletes the entry of the communication slave disconnected from field network 2 in synchronization accuracy management table 150 (step S222). Synchronization correction frame transmission number 1502 of the newly added entry is initially set to zero. That is, when any communication slave is newly connected to field network 2, the communication master resets the number of transmissions of synchronization correction frame 172 (first information) for the communication slave.

On the other hand, when the connection state of the communication slave in field network 2 does not change (NO in step S220), the processing of step S222 is skipped.

Then, the pieces of processing from step S212 are repeated.

The synchronization accuracy of each communication slave is managed by the processing of the communication master as described above.

E. Application Examples

Some application examples using the synchronization accuracy management function as described above will be described.

(e1: Support Device 500)

A schematic diagram illustrates a hardware configuration example of the support device 500 available by control system 1 of the embodiment.

Figure 11:
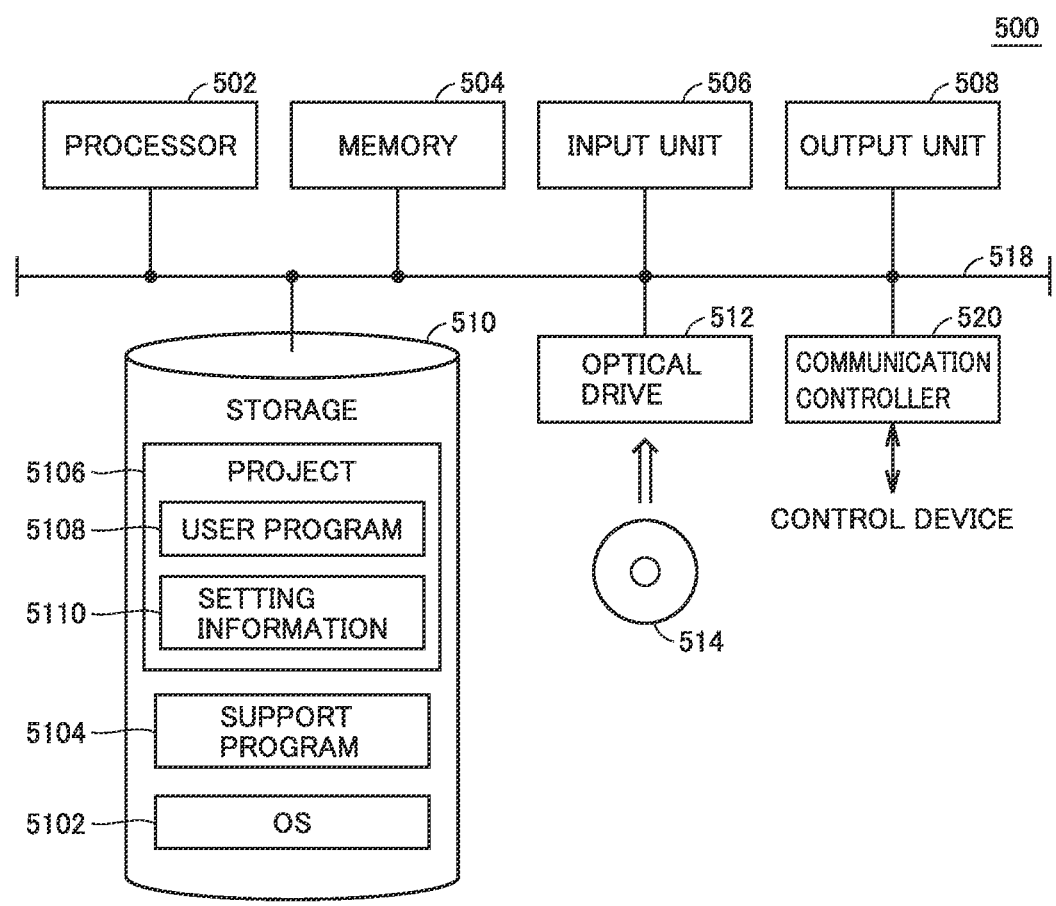
FIG. 11 is a block diagram illustrating a hardware configuration example of a support device available by the control system according to the embodiment.

FIG. 11 is a block diagram illustrating the hardware configuration example of support device 500 available by control system 1 according to the embodiment. For example, support device 500 is implemented using hardware (for example, a general-purpose personal computer) according to a general-purpose architecture.

As illustrated in FIG. 11, support device 500 includes a processor 502, a memory 504, an input unit 506, an output unit 508, a storage 510, an optical drive 512, and a USB controller 520. These components are connected to each other through a processor bus 518.

Processor 502 is constructed with a CPU, a GPU, and the like, and reads a program (as an example, an OS 5102 and a support program 5104) stored in storage 510, expands the program in memory 504, and executes the program, thereby implementing various pieces of processing.

Main memory 504 is configure of a volatile storage device such as a DRAM or an SRAM. For example, storage 510 includes a non-volatile storage device such as an HDD or an SSD.

OS 5102 implementing the basic function, support program 5104 providing the function as support device 500, and project data 5106 produced by the user in a development environment are stored in storage 510.

Support device 500 provides the development environment in which the setting for the unit and the device configuring control system 1 and the production of the program executed in control system 1 can be integrally performed. Project data 5106 includes the data generated by the integrated development environment. Typically, project data 5106 includes a user program 5108 executed by control device 100 and setting information 5110 that defines various setting values of control system 1. User program 5108 is converted into an object code, and then transmitted to and stored in control device 100.

Input unit 506 is configured of a keyboard, a mouse, and the like, and receives a user operation. Output unit 508 includes a display, various indicators, and a printer, and outputs a processing result from the processor 502 and the like.

USB controller 520 exchanges the data with control device 100 and the like through the USB connection.

Support device 500 includes optical drive 512, and a program stored in a storage medium 514 (for example, an optical storage medium such as a digital versatile disc (DVD)) in which a computer-readable program is non-transiently stored is read and installed in storage 510 or the like.

Support program 5104 and the like executed by support device 500 may be installed through computer-readable storage medium 514, or installed by being downloaded from the server device or the like on the network. Furthermore, the function provided by support device 500 may be implemented using a part of the module provided by the OS.

Support device 500 may be removed from control device 100 during operation of control system 1.

Although the configuration example in which the required functions are provided by one or more processors executing the program has been illustrated in FIG. 11, some or all of these provided functions may be mounted using a dedicated hardware circuit (for example, ASIC or FPGA).

(e2: System Variable Indicating Synchronization Accuracy)

As described above, control device 100 functioning as the communication master can estimate the synchronization accuracy in each communication slave. For this reason, when the synchronization accuracy in each communication slave estimated by control device 100 can be referred to by the user program, an application in which high-accuracy control is required can be reliably implemented.

As an example, control device 100 functioning as the communication master may provide a system variable indicating the synchronization accuracy in each communication slave. That is, the communication master is control device 100 that executes the user program, and the synchronization accuracy estimated for each communication slave can be referred to in the user program.

Figure 12:
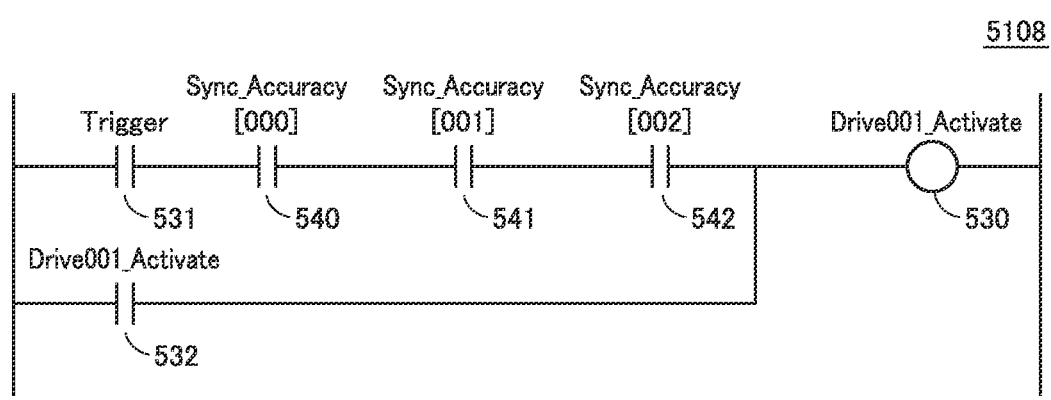
FIG. 12 is a view illustrating an example of a user program using a system variable provided by a control device configuring the control system according to the embodiment.

FIG. 12 is a view illustrating an example of the user program using the system variable provided by control device 100 configuring control system 1 according to the embodiment. The user program in FIG. 12 can be produced in the development environment provided by support device 500.

FIG. 12 illustrates an example in which a structure variable Sync_Accuracy [ ] (in [ ], a node address or the like is designated as an index) indicating the synchronization accuracy in each communication slave can be used. Each member of structure variable Sync_Accuracy [ ] becomes "TRUE" when the sufficient synchronization accuracy can be secured in the corresponding communication slave, and indicates "FALSE" in other states. In this example, the synchronization accuracy estimated for each communication slave can be referred to as the structure variable.

In user program 5108 of FIG. 12, a logical product (AND) of a contact 531 of a variable name Trigger, a member 540 (Sync_Accuracy [000]) of an index "000" of structure variable Sync_Accuracy [ ], a member 541 (Sync_Accuracy [001]) of an index "001" of structure variable Sync_Accuracy [ ], and a member 542 (Sync_Accuracy) [002]) of an index "002" of structure variable Sync_Accuracy [ ] is defined as a condition enabling a coil 530 of variable name Drive001_Activate.

In addition, a contact 532 having variable name Drive001_Activate is used for a self-holding circuit.

In user program 5108 of FIG. 12, when variable name Trigger is driven to "TRUE" only in the case where the synchronization accuracy is sufficiently high in all the communication slaves in which the node address is "000", "001", "002", variable name Drive001_Activate transitions to "TRUE". That is, a start condition can be defined such that the sufficient synchronization accuracy can be ensured in all the communication slaves in which the node address is "000", "001", "002".

The structure variable is not limited to the structure variable in FIG. 12, but the individual system variable indicating the synchronization accuracy may be assigned to each communication slave. For example, the system variable such as a variable name Sync_Accuracy_000 may be made available to the communication slave in which the node address is "000".

When control system 1 includes a plurality of field networks 2, the structure variable indicating the synchronization accuracy in each communication slave may be prepared for each field network 2. In this case, for example, information specifying target field network 2 may be included in a part of the variable name of the structure variable, such as a structure variable Sync_Accuracy_001_[ ]. Alternatively, a two-dimensional index including identification information specifying target field network 2 and identification information specifying the target communication slave, such as a structure variable Sync_Accuracy [ ] [ ], may be adopted.

The value of the system variable as described above is sequentially updated in step S218 of the processing procedure in FIG. 10.

(e3: Management of Synchronization Accuracy in Arbitrary Group)

Sometimes the synchronization accuracy is desired to be managed for not only the group of communication slaves connected to the same field network 2 as described above but also a plurality of communication slaves belonging to a group arbitrarily set by the user. For example, a plurality of servo drivers can be set so as to be allocated to a single axis group, and there is a need to manage the synchronization accuracy as a whole for the axis group.

Figure 13:
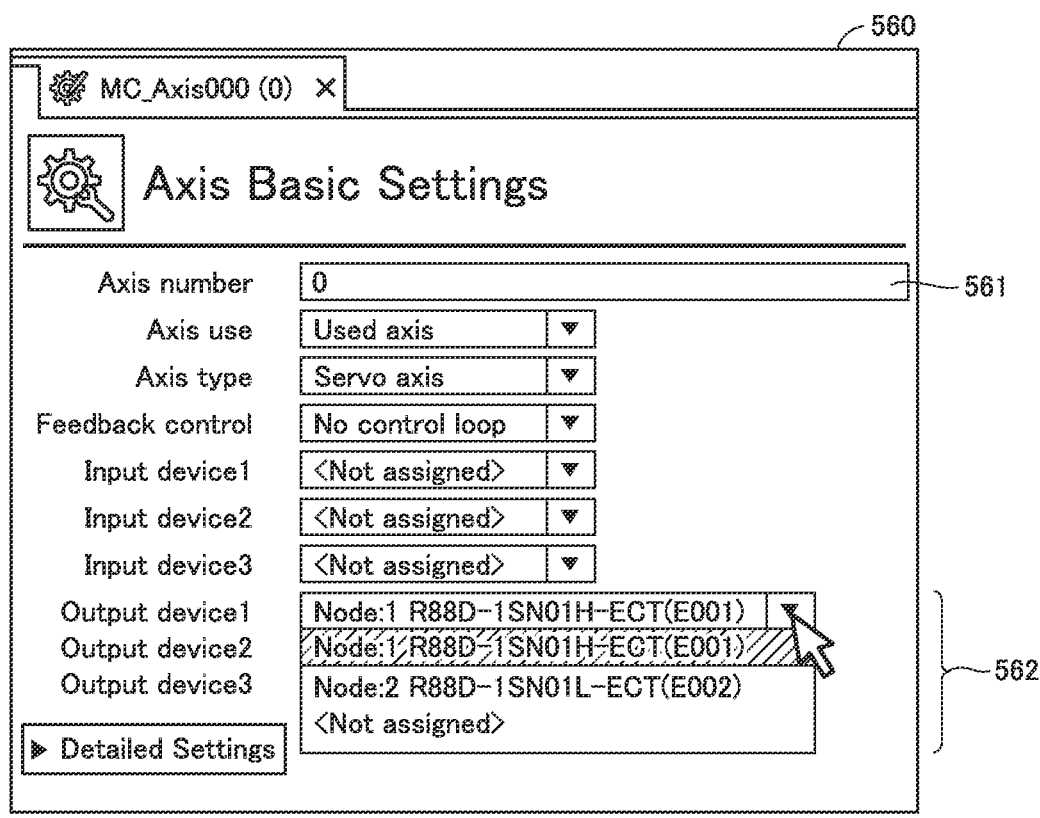
FIG. 13 is a schematic diagram illustrating a setting screen example in which an axis setting is performed in the support device available by the control system according to the embodiment.

FIG. 13 is a schematic diagram illustrating a setting screen example 560 in which an axis setting is performed in support device 500 available by control system 1 according to the embodiment. With reference to FIG. 13, in setting screen example 560, the user inputs an axis group number 561 identifying each axis group, and inputs a member setting 562 indicating the servo driver (communication slave) belonging to each axis group.

The plurality of servo drivers (communication slaves) designated by member setting 562 operate as a member of a common axis group. For this reason, when the control is performed in the target axis group, all the members need to ensure the sufficient synchronization accuracy.

An interface ensuring the synchronization accuracy may be prepared in a command (as an example, a command in a function block format) implementing the control in the axis group.

Figure 14:
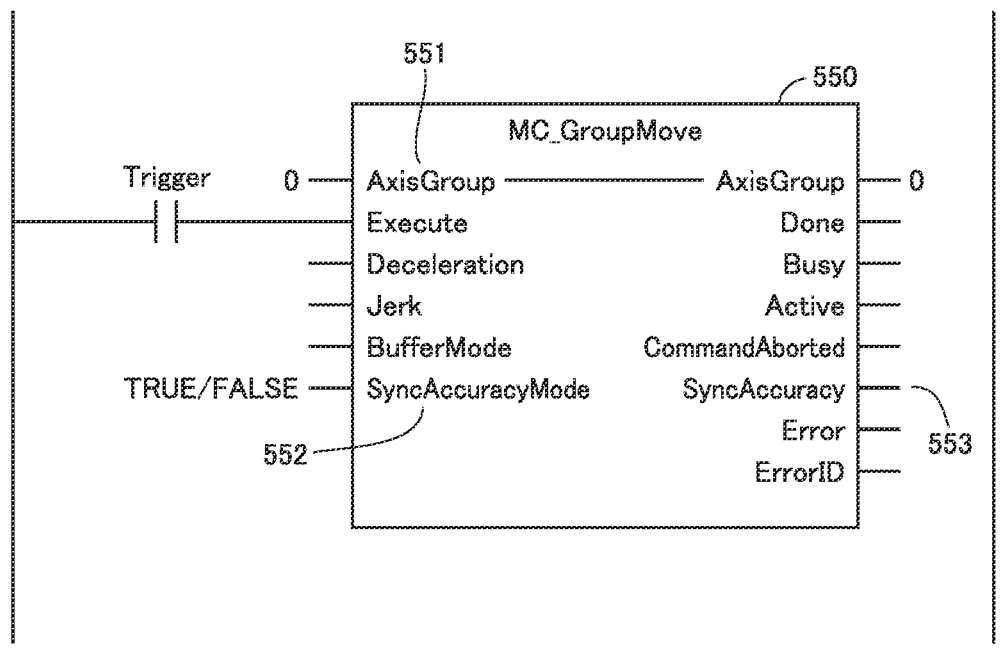
FIG. 14 is a view illustrating an example of a function block command performing control in an axis group available by the control system according to the embodiment.

FIG. 14 is a view illustrating an example of a function block command performing the control in the axis group available by control system 1 according to the embodiment. The function block commands in FIG. 14 can be produced in the development environment provided by support device 500.

With reference to FIG. 14, a function block command 550 is a command collectively outputting a control command to each member of the axis group input to an axis group setting 551. Function block command 550 in FIG. 14 can selectively set enabling or disabling of a synchronization accuracy ensuring mode 552. Synchronization accuracy ensuring mode 552 is a mode to be switched whether to permit the output of the control command or not on the condition that the sufficient synchronization accuracy is secured in all members (communication slaves) of the target axis group. That is, when synchronization accuracy ensuring mode 552 is set to "TRUE", the control command is not output unless the synchronization accuracy in all the members (communication slaves) of the target axis group is sufficiently ensured. On the other hand, when synchronization accuracy ensuring mode 552 is set to "FALSE", the control command is allowed to be output even when the synchronization accuracy in some or all the members (communication slaves) of the target axis group is not sufficiently ensured.

The state of the synchronization accuracy of the member (communication slave) belonging to the target axis group is output to a synchronization accuracy status output 553. The output state of the synchronization accuracy means the state of the entire axis group, and when the synchronization accuracy in any member (communication slave) is not sufficiently secured, it is determined that the synchronization accuracy is not sufficiently secured for the entire axis group.

Thus, the processing in which the high-accuracy control is required and the like are certainly implemented using the state value output from the synchronization accuracy status output 553 as a monitor or a condition.

As described above, in the user program, the synchronization accuracy can be referred to in the entire plurality of predetermined communication slaves (for example, the axis group including a plurality of members as described above). The predetermined synchronization accuracy in all the plurality of communication slaves may be output from the function block command.

(e4: State Display Screen Example)

In addition to the reference in the user program as described above, the state of the synchronization accuracy may be visualized.

Figure 15:
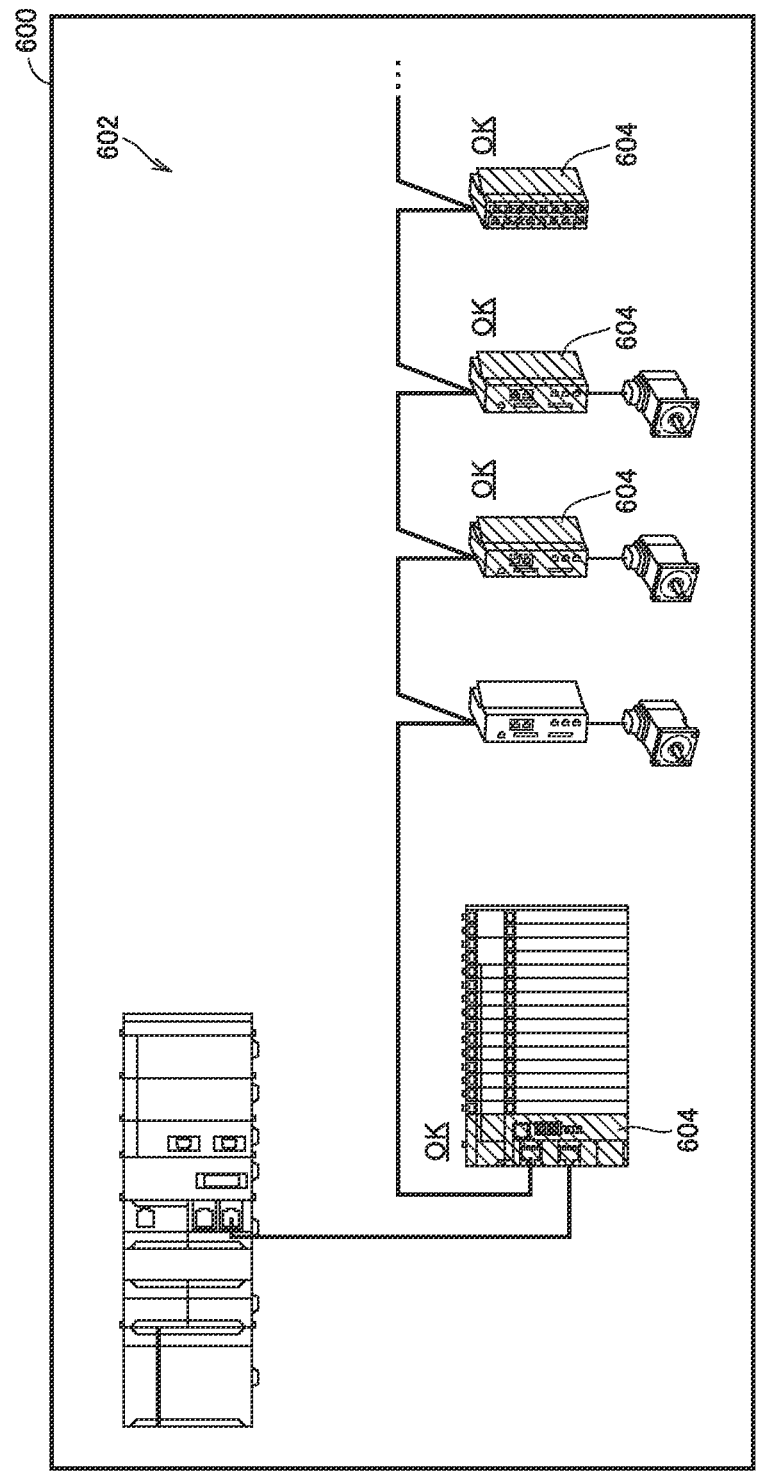
FIG. 15 is a schematic diagram illustrating an example of a state display screen provided in the control system according to the embodiment.

FIG. 15 is a schematic diagram illustrating an example of the state display screen provided in control system 1 of the embodiment. A state display screen 600 in FIG. 15 may be displayed on support device 500, or may be displayed on a human machine interface (HMI) (not illustrated). In any case, the display may be performed according to the synchronization accuracy state managed by control device 100 that is the communication master.

In state display screen 600 of FIG. 15, a network configuration 602 illustrating the overall configuration of control system 1 is illustrated, and highlighting 604 is performed for the communication slave in which the sufficient synchronization accuracy is ensured. Highlighting 604 is an example of a display mode different from that of the communication slave in which the sufficient synchronization accuracy is not secured, and a color or brightness may be made different, or the display mode such as blinking or size variation may be made dynamically different.

By presenting state display screen 600 as illustrated in FIG. 15 to the user, the user can grasp at a glance whether or not the control operation is started.

The state of the synchronization accuracy is not limited to state display screen 600 as illustrated in FIG. 15, but the state of the synchronization accuracy may be visualized in a list form or another display form.

As described above, the information whether or not the sufficient synchronization accuracy is secured in one or more communication slaves can be used as a condition of whether or not the control can be executed, or can be presented to the user. Various operations as exemplified below can be performed using these pieces of information.

(e5: Operation Example)

For example, a group of the plurality of communication slaves to be subjected to synchronization control, a group of the plurality of communication slaves to be subjected to linkage control, and the like are assumed as the relationship in which attention needs to be paid to the synchronization accuracy as described above. For example, the group to be subjected to the synchronization control include a device group (for example, the axis group as illustrated in FIG. 13) configuring a single mechanism. Alternatively, a combination of a device that drives some mechanism and an IO device that controls the device can be cited.

Alternatively, a series of work including a plurality of pieces of processing can be regarded as the group. For example, when processing B is executed after processing A is completed, the processing A and the processing B can be regarded as the same group. In this case, a condition that the sufficient synchronization accuracy is secured for both the communication slaves involved in the processing A and the processing B may be set as a condition starting the execution of the control.

Whether such a group is in the state where the highly-accurate synchronization control can be performed (that is, the sufficient synchronization accuracy is secured for the entire group) or the state where the highly-accurate synchronization control cannot be performed (that is, the sufficient synchronization accuracy is not secured for the entire group) can be explicitly grasped using the system variable, the function block command, or the like as described above. Whether or not the control is performed for the group can be appropriately determined using such information regarding whether or not the synchronization control can be performed.

The execution of the control may be permitted only in the state where the sufficient synchronization accuracy is secured for the entire group according to the control target, or the execution of the control may be started even when the sufficient synchronization accuracy is not secured for the entire group. Whether or not the control is performed may be appropriately determined in consideration of the state of individual communication slave included in the group, the possibility of damage to the device due to a synchronization deviation, and the like.

When the execution of the control is permitted only in the state where the sufficient synchronization accuracy is secured for the entire group, preferably whether or not the sufficient synchronization accuracy is secured for the entire group can be presented to the user. When the control is not executed, the reason can be easily grasped by presenting such information to the user.

In addition, a part of the mechanism may be changed according to a production object (set-up change). For example, it is assumed that the type of a tool hand at the robot tip is changed (for example, a chuck mechanism and a vacuum mechanism are replaced). The change in mechanism may be physically replaced or may be switched by a rotation mechanism or the like. After the set-up change, sometimes various fine adjustments may be required. In the processing related to the set-up change, a state where the sufficient synchronization accuracy can be secured as necessary may be set as a condition starting the execution of the control.

Sometimes a plurality of control devices 100 may control a single mechanism. In this case, the execution of the synchronization control may be guaranteed to the single mechanism by exchanging information indicating the synchronization accuracy in the communication slave related to the control of the single mechanism.

F. Others

In the above description, the field network using EtherCAT is mainly exemplified as the communication protocol. However, the communication protocol is not limited to EtherCAT, but can be applied to any system adopting a configuration in which a control frame (synchronization correction frame) causing counter values of synchronization counters to be matched with each other is repeatedly transmitted between the communication master and each communication slave.

The field network is not limited to a wired network, but may be a wireless network or a mixture of the wired network and the wireless network.

In the above description, the configuration in which all the communication slaves network-connected to control device 100 through field network 2 include the synchronization counter implementing the synchronization control has been exemplified. However, the communication slave that does not implement the synchronization control or the communication slave that cannot implement the synchronization control may be connected to field network 2. That is, the communication slave that executes asynchronous control may be connected to field network 2.

For example, some of the communication slaves connected to field network 2 may have the synchronization counter. However, a mounting form in which the synchronization count is not enabled or a mounting form in which the synchronization counter is updated but is not used for the control may be adopted. In the implementation form, the user may explicitly set either the synchronous control or the asynchronous control to any communication slave.

Furthermore, some of the communication slaves connected to field network 2 may not include the synchronization counter (not include the synchronization counter). In the implementation form, because the synchronous control cannot be executed, the asynchronous control is executed.

G. Appendix

The above embodiment includes the following technical ideas.

[Configuration 1]
A control system comprising:
a communication master (100); and
one or more communication slaves (200, 300, 400) network-connected to the communication master,
wherein each of the communication master and the one or more communication slaves comprises a synchronization counter (121, 221, 321, 421),
the communication master comprises means (154) configured to repeat transmission of first information (172) indicating a counter value of the synchronization counter of the communication master to the one or more communication slaves through a network (2),
each of the one or more communication slaves comprises means (SQ21 to SQ25; S118) configured to update the counter value of the synchronization counter of each of the one or more communication slaves based on the received first information upon receiving the first information from the communication master, and
the communication master comprises means (152) configured to manage a total number of pieces of the first information transmitted for each of the one or more communication slaves, and estimate synchronization accuracy with respect to the communication master for each communication slave based on a number of transmissions of the first information for each communication slave.

[Configuration 2]
The control system according to the configuration 1, wherein the communication master is a control device configured to execute a user program (1081), and
the synchronization accuracy estimated for each communication slave can be referred to in the user program.

[Configuration 3]
The control system according to the configuration 2, wherein the synchronization accuracy estimated for each communication slave can be referred to as a structure variable (540, 541, 542).

[Configuration 4]
The control system according to the configuration 2, wherein in the user program, the synchronization accuracy can be referred to in a plurality of predetermined communication slaves as a whole.

[Configuration 5]
The control system according to the configuration 4, wherein the synchronization accuracy (553) in the plurality of predetermined communication slaves as a whole is output from a function block command (550).

[Configuration 6]
The control system according to any one of the configurations 1 to 5, wherein the communication master is configured to determine the synchronization accuracy of one of the communication slaves based on the number of transmissions of the first information for the one of the communication slaves with respect to a predetermined number of transmissions.

[Configuration 7]
The control system according to any one of the configurations 1 to 6, wherein when an additional communication slave is newly connected to the network, the communication master is configured to reset the number of transmissions of the first information for the communication slave.

[Configuration 8]
The control system according to any one of the configurations 1 to 7, wherein each of the one or more communication slaves are configured to update the counter value of the synchronization counter based on first information (172) received from the communication master and a propagation delay time (Td1 to Td5) acquired in advance.

[Configuration 9]
A communication control method of a control system (1) comprising a communication master (100) and one or more communication slaves (200, 300, 400) network-connected to the communication master, each of the communication master and the one or more communication slaves comprising a synchronization counter (121, 221, 321, 421),
the communication control method comprising:
repeating (S212, S214), by the communication master, transmission of first information indicating a counter value of the synchronization counter of the communication master to the one or more communication slaves through a network;
updating (S118) the counter value of the synchronization counter of each of the one or more communication slaves based on the received first information when each of the one or more communication slaves receives the first information from the communication master;
managing (S216, S218, S222), by the communication master, a total number of pieces of the first information transmitted for each of the one or more communication slaves; and
estimating (S216), by the communication master, synchronization accuracy with respect to the communication master for each communication slave based on a number of transmissions of the first information for each communication slave.

[Configuration 10]
A control device (100) that functions as a communication master network-connected to one or more communication slaves (200, 300, 400),
the control device comprising:
a synchronization counter (121);
means (154) configured to repeat transmission of first information (172) indicating a counter value of the synchronization counter of the control device to the one or more communication slaves through a network (2),
each of the one or more communication slaves updating the counter value of a synchronization counter (121, 221, 321, 421) of each of the one or more communication slaves based on the received first information upon receiving the first information; and means (152) configured to manage a total number of pieces of the first information transmitted for each of the one or more communication slaves and estimate synchronization accuracy with respect to the communication master for each communication slave based on the number of transmissions of the first information for each communication slave.

H. Advantages

The control system of the embodiment manages the number of synchronization correction frames 172 transmitted from the communication master to each communication slave for each communication slave, so that each communication slave can estimate the synchronization accuracy with respect to the communication master. Even in the case where highly-accurate synchronization control is required, the synchronization control can be certainly implemented using the synchronization accuracy for each communication slave estimated in this way. In addition, even when the communication master cannot directly acquire the synchronization accuracy status in each communication slave, the communication master can implement the required synchronization control without increasing a network load by indirectly estimating the synchronization accuracy.

It should be considered that the disclosed embodiment is an example in all respects and not restrictive. The scope of the present invention is defined by not the above description, but the claims, and it is intended that all modifications within the meaning and scope of the claims are included in the present invention.

REFERENCE SIGNS LIST

1: control system, 2: field network, 4, 6: internal bus, 100: control device, 101: processing unit, 102, 212, 312, 502: processor, 103, 203: functional unit, 104: chip set, 106, 214, 314, 504: memory, 108, 510: storage, 110: network controller, 112, 520: USB controller, 114: memory card interface, 116: memory card, 118, 218: internal bus controller, 119, 121, 219, 221, 321, 421: synchronization counter, 120, 220, 320: field network controller, 150: synchronization accuracy management table, 152: synchronization accuracy management module, 154: synchronization counter update module, 156: propagation delay time measurement module, 158: network state monitoring module, 160: transmission and reception module, 170: delay time measurement frame, 172: synchronization correction flame, 200: remote IO device, 201: coupler unit, 210, 310: main controller, 216, 316: firmware, 300: servo driver, 330: drive circuit, 350: servo motor, 400: safety IO device, 500: support device, 506: input unit, 508: output unit, 512: optical drive, 514: storage medium, 518: processor bus, 530: coil, 531, 532: contact, 540, 541, 542: member, 550: function block command, 551: axle group setting, 552: synchronization accuracy ensuring mode, 553: synchronization accuracy status output, 560: setting screen example, 561: axle group number, 562: member setting, 600: state display screen, 602: network configuration, 604: highlighting, 1081, 5108: user program, 1082: system program, 1501: communication slave identification information, 1502: synchronization correction flame transmission number, 1503: synchronization accuracy, 5104: support program, 5106: project data, 5110: setting information, Td1 to Td5: propagation delay time

The invention claimed is:

1. A control system comprising:
a communication master; and
one or more communication slaves connected to the communication master by a network,
wherein each of the communication master and the one or more communication slaves comprises a synchronization counter,
the communication master is configured to repeat transmission of a control frame including a counter value of the synchronization counter of the communication master to the one or more communication slaves through the network,
each of the one or more communication slaves is configured to receive the control frame and update the counter value of the synchronization counter of the communication slave based on the received control frame, and
the communication master is configured to manage a total number of the control frames transmitted for each of the one or more communication slaves, and estimate a synchronization accuracy with respect to the communication master for each communication slave based on a number of transmissions of the control frames for each communication slave.

2. The control system according to claim 1, wherein:
the communication master is a control device configured to execute a user program, and
the user program refers to the synchronization accuracy estimated for each communication slave.

3. The control system according to claim 2, wherein the synchronization accuracy estimated for each communication slave is indicated in a structure variable.

4. The control system according to claim 2, wherein the one or more communication slaves comprises a plurality of communication slaves, and
wherein in the user program, the synchronization accuracy for each of a plurality of predetermined communication slaves of the plurality of communication slaves are combined together as a combined synchronization accuracy.

5. The control system according to claim 4, wherein the combined synchronization accuracy is output from a function block command.

6. The control system according to claim 1, wherein the communication master is configured to determine the synchronization accuracy of one of the one or more communication slaves based on the number of transmissions of the control frame for the one of the one or more communication slaves with respect to a threshold number of transmissions.

7. The control system according to claim 1, wherein when an additional communication slave is newly connected to the network, the communication master is configured to reset the number of transmissions of the control frames for the additional communication slave.

8. The control system according to claim 1, wherein each of the one or more communication slaves is configured to update the counter value of the synchronization counter of the communication slave based on the control frame received from the communication master and a propagation delay time acquired in advance.

9. A communication control method of a control system comprising a communication master and one or more communication slaves connected to the communication master by a network, each of the communication master and the one or more communication slaves comprising a synchronization counter,
the communication control method comprising:
repeating, by the communication master, transmission of a control frame including a counter value of the synchronization counter of the communication master to the one or more communication slaves through the network;

receiving, by each of the one or more communication slaves, the control frame and updating, by each of the one or more communication slaves, the counter value of the synchronization counter of the communication slaves based on the received control frame;

managing, by the communication master, a total number of the control frames transmitted for each of the one or more communication slaves; and estimating, by the communication master, a synchronization accuracy with respect to the communication master for each communication slave based on a number of transmissions of the control frame for the communication slave.

10. The communication control method according to claim 9, wherein:

the communication master is a control device configured to execute a user program, and the user program refers to the synchronization accuracy estimated for each communication slave.

11. The communication control method according to claim 10, wherein the synchronization accuracy estimated for each communication slave is indicated in a structure variable.

12. The communication control method according to claim 10, wherein the one or more communication slaves comprises a plurality of communication slaves, and wherein in the user program, the synchronization accuracy for each of a plurality of predetermined communication slaves of the plurality of communication slaves are combined together as a combined synchronization accuracy.

13. The communication control method according to claim 12, wherein the combined synchronization accuracy is output from a function block command.

14. The communication control method according to claim 9, wherein the estimating comprises determining the synchronization accuracy of one of the one or more communication slaves based on the number of transmissions of the control frame for the one of the one or more communication slaves with respect to a threshold number of transmissions.

15. A control device that functions as a communication master connected to one or more communication slaves by a network, the control device comprising:

a synchronization counter, wherein the communication master is configured to:

repeat transmission of a control frame including a counter value of the synchronization counter of the control device to the one or more communication slaves through the network, each of the one or more communication slaves receiving the control frame and updating the counter value of the synchronization counter of the communication slave based on the received control frame, and manage a total number of the control frames transmitted for each of the one or more communication slaves and estimate a synchronization accuracy with respect to the communication master for each communication slave based on the number of transmissions of the control frame for the communication slave.

16. The control device according to claim 15, wherein:

the control device is configured to execute a user program, and the user program refers to the synchronization accuracy estimated for each communication slave.

17. The control device according to claim 16, wherein the synchronization accuracy estimated for each communication slave is indicated in a structure variable.

18. The control device according to claim 16, wherein the one or more communication slaves comprises a plurality of communication slaves, and wherein in the user program, the synchronization accuracy for each of a plurality of predetermined communication slaves of the plurality of communication slaves are combined together as a combined synchronization accuracy.

19. The control device according to claim 18, wherein the combined synchronization accuracy is output from a function block command.

20. The control device according to claim 15, wherein the control device is configured to determine the synchronization accuracy of one of the one or more communication slaves based on the number of transmissions of the control frame for the one of the one or more communication slaves with respect to a threshold number of transmissions.

* * * * *